US011210122B2

(12) United States Patent
Yabushita et al.

(10) Patent No.: US 11,210,122 B2
(45) Date of Patent: Dec. 28, 2021

(54) VIRTUAL NETWORK FUNCTION MANAGEMENT FOR CREATING SEQUENCE USING DEPENDENCY ENTRY DEFINED TO CONFIRM CONSTRAIN VIOLATION

(71) Applicant: NEC CORPORATION, Tokyo (JP)

(72) Inventors: Naoya Yabushita, Tokyo (JP); Ryota Mibu, Tokyo (JP); Hirokazu Shinozawa, Tokyo (JP); Yoshiki Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 15/546,411

(22) PCT Filed: Jan. 27, 2016

(86) PCT No.: PCT/JP2016/052290
§ 371 (c)(1),
(2) Date: Jul. 26, 2017

(87) PCT Pub. No.: WO2016/121802
PCT Pub. Date: Aug. 4, 2016

(65) Prior Publication Data
US 2018/0024852 A1    Jan. 25, 2018

(30) Foreign Application Priority Data
Jan. 28, 2015 (JP) .............................. JP2015-014616

(51) Int. Cl.
*G06F 9/455* (2018.01)
*G06F 9/46* (2006.01)
(Continued)

(52) U.S. Cl.
CPC ............ *G06F 9/45558* (2013.01); *G06F 9/46* (2013.01); *G06F 9/50* (2013.01); *G06F 9/5077* (2013.01);
(Continued)

(58) Field of Classification Search
None
See application file for complete search history.

(56) References Cited

U.S. PATENT DOCUMENTS 7,904,540 B2 *   3/2011   Hadad ................... G06F 9/4856
                                                            709/223
8,060,865 B2    11/2011   Kimmerly
(Continued)

FOREIGN PATENT DOCUMENTS

| JP | 2009-524129 A  | 6/2009  |
| JP | 2009245317 A   | 10/2009 |
| WO | 2014/110453 A1 | 7/2014  |

OTHER PUBLICATIONS

ETSI GS NFV-MAN 001 V1.1.1, Network Functions Virtualisation (NFV); Management and Orchestration, Dec. 2014, pp. 1-184.
(Continued)

*Primary Examiner* — Meng Ai T An
*Assistant Examiner* — Zujia Xu
(74) *Attorney, Agent, or Firm* — Sughrue Mion, PLLC

(57) ABSTRACT

A virtualization management/orchestration apparatus is provided with: a Network Function Virtualization Orchestrator (NFVO) that reads a Network Service Descriptor (NSD) in which an entry defining dependency between a VNF and a prescribed element is provided, and creates the VNF and the prescribed element according to the dependency defined in the NSD; and/or a VNF manager (VNFM) that reads a Virtualized Network Function Descriptor (VNFD) provided with an entry defining dependency between a VM and a
(Continued)

prescribed element, and creates the VM and the prescribed element according to the dependency defined in the VNFD.

8 Claims, 23 Drawing Sheets

(51) Int. Cl.
*G06F 9/50* (2006.01)
*H04L 29/08* (2006.01)

(52) U.S. Cl.
CPC .............. *G06F 2009/45562* (2013.01); *G06F 2009/45595* (2013.01); *H04L 67/1097* (2013.01)

(56) References Cited

U.S. PATENT DOCUMENTS

| | | | |
|---|---|---|---|
| 8,438,563 | B2 | 5/2013 | Yamaguchi et al. |
| 2007/0162904 | A1 | 7/2007 | Kimmerly |
| 2009/0249334 | A1 | 10/2009 | Yamaguchi et al. |
| 2014/0201374 | A1 | 7/2014 | Ashwood-Smith et al. |
| 2014/0317261 | A1 | 10/2014 | Shatzkamer et al. |
| 2014/0380308 | A1* | 12/2014 | Hassine .............. G06F 9/45558 718/1 |
| 2015/0347264 | A1* | 12/2015 | Mohammed ............ H04L 67/10 714/45 |
| 2016/0335111 | A1* | 11/2016 | Bruun ................. H04L 41/0896 |

OTHER PUBLICATIONS

Koji Tsubouchi, et al., "NFV Management and Orchestration Technology to Automatically Build Network Services on Demand", The Institute of Electronics, Information and Communication Engineers Technical Report, ISSN 0913-5685, Sep. 4, 2014, pp. 107-112, vol. 114, No. 206.

International Search Report of PCT/JP2016/052290, dated May 10, 2016. [PCT/ISA/210].

Extended European Search Report dated Sep. 26, 2018 issued by the European Patent Office in counterpart application No. 16743405.9.

Communication dated Dec. 1, 2020 from the Japanese Patent Office in Application No. Machine 2016-572094 Translation.

* cited by examiner

Network Service Descriptor(NSD)
Virtual Link Descriptor(VLD)
VNF Forwarding Graph Descriptor(VNFFGD)
VNF Descriptor (VNFD)
Physical Network Function Descriptor(PNFD)

Network Service Record (NSR)
VNFFG Record (VNFFGR)
Virtual Link Record (VLR)
VNF Record (VNFR)
PNF Record (PNFR)

FIG. 5

NSD

| Identifier | Type | Cardinality | Description |
|---|---|---|---|
| id | Leaf | 1 | ID of this Network Service Descriptor |
| vendor | Leaf | 1 | Provider or vendor of the Network Service |
| ... | | | |
| vnf_dependency | Element | 0..N | CHANGE LEAF => ELEMENT, DEPENDENT NW ALSO CAN BE DESCRIBED | nsd:vnf_dependency

| Identifier | Type | Cardinality | Description |
|---|---|---|---|
| createVNF | Leaf | 1 | VNF TO BE CREATED |
| targetVNF | Leaf | 0..N | VNF THAT MUST BE CREATED BEFORE CREATION OF VNF SPECIFIED BY CREATE VNF |
| targetENW | Leaf | 0..N | EXTERNAL NW THAT MUST BE CREATED BEFORE CREATION OF VNF SPECIFIED BY CREATE VNF |
| targetSTR | Leaf | 0..N | STORAGE THAT MUST BE CREATED BEFORE CREATION OF VNF SPECIFIED BY CREATE VNF |

VNFD

| Identifier | Type | Cardinality | Description |
|---|---|---|---|
| id | Leaf | 1 | ID (e.g., name) of this VNFD |
| vendor | Leaf | 1 | The vendor generating this VNFD |
| ... | | | |
| dependency | Element | 0..N | CHANGE LEAF => ELEMENT, DEPENDENT NW/STORAGE ALSO CAN BE DESCRIBED | vnfd:dependency

| Identifier | Type | Cardinality | Description |
|---|---|---|---|
| createVM | Leaf | 1 | VM TO BE CREATED |
| targetVM | Leaf | 0..N | VM THAT MUST BE CREATED BEFORE CREATION OF VM SPECIFIED BY CREATE VM |
| targetENW | Leaf | 0..N | EXTERNAL NW THAT MUST BE CREATED BEFORE CREATION OF VM SPECIFIED BY CREATE VM |
| targetVL | Leaf | 0..N | INTER-VNFC NW, WHICH MUST BE CREATED BEFORE CREATION OF VM SPECIFIED BY CREATE VM |
| targetSTR | Leaf | 0..N | STORAGE THAT MUST BE CREATED BEFORE CREATION OF VM SPECIFIED BY CREATE VM |

FIG. 16 (EXAMPLE 3)

(EXAMPLE 3)

VIRTUAL NETWORK FUNCTION MANAGEMENT FOR CREATING SEQUENCE USING DEPENDENCY ENTRY DEFINED TO CONFIRM CONSTRAIN VIOLATION

TECHNICAL FIELD

Cross-Reference to Related Applications

This application is a National Stage of International Application No. PCT/JP2016/052290 filed Jan. 27, 2016, claiming priority based on Japanese Patent Application No. 2015-014616, filed Jan. 28, 2015, the contents of all of which are incorporated herein by reference in their entirety. into this application. The present invention relates to a virtualization management/orchestration apparatus, a virtualization management/orchestration method, and a program, and in particular relates to a virtualization management/orchestration apparatus, a virtualization management/orchestration method, and a program, that can be preferably applied to management and orchestration of Network Functions Virtualization.

BACKGROUND

With regard to technology for virtualizing server computing, storage or network functionality and the like, Network Functions Virtualization (NFV) is known, which is implemented through software by Virtual Machine(s) (VM) installed in a virtualized layer such as a HyperVisor or the like. The implementation is done, for example, based on MANO (Management & Orchestration) architecture. FIG. 1 is a diagram citing FIG. 5.1 (The NFV-MANO architectural framework with reference points) of page 23 of Non-Patent Literature (NPL) 1.

Referring to FIG. 1, a VNF (Virtualized Network Function) corresponds to an application operated by a virtual machine (VM) on a server, and implements network functionality by software. As the VNF, in an EPC (Evolved Packet Core) which is a core network of an LTE (Long Term Evolution) network, for example, MME (Mobility Management Entity) or S-GW (Serving Gateway), P-GW (PDN Gateway) or the like may be implemented by software (virtual machine). In the example of FIG. 1, a management function known as EM (Element Manager) is provided for each VNF, for example.

An NFVI (Network Function Virtualization Infrastructure) forming a VNF execution infrastructure is an infrastructure for flexibly handling hardware resources of a physical machine (server), such as computing, storage, network functionality and the like, as virtualized hardware resources such as virtualized computing, virtualized storage, virtualized networks and the like, virtualized in a virtualization layer as in a hypervisor or the like.

The NFV MANO (Management & Orchestration) is provided with an NFV-Orchestrator (NFVO), a VNF-Manager (VNFM) and a Virtualized Infrastructure Manager (VIM).

The NFV-Orchestrator (NFVO) performs lifecycle management (Instantiation, Scaling, Termination, Updates etc. of a NS (Network Service) instance) for NFVI resource orchestration and NS. It performs management of NS catalogs (NSD/VLD/VNFFGD), VNF catalogs (VNFD/VM image/manifest file), and holds an NFV instance repository, and NFVI resource repository.

The VNF-Manager (VNFM) performs VNF lifecycle management (instantiation, update, query, scaling, termination etc.) and event notification.

The Virtualized Infrastructure Manager (VIM) controls NFVI via a virtualization layer (computing, storage, network resource management, fault monitoring of the NFVI that is an NFV execution infrastructure, monitoring of resource information, or the like).

OSS (Operations Support Systems) is a general term for systems (equipment, software, structure, etc.) necessary, for example, for a communication provider (carrier) to build and operate a service. BSS (Business Support Systems) is a general term for information systems (equipment, software, structure, etc.) that a communications provider (carrier), for example, uses for usage charging, billing, customer support and the like.

The NS catalog represents a repository of a network service (NS). The NS catalog supports creation and management of a network service (NS) deployment template (Network Service Descriptor (NSD), Virtual Link Descriptor (VLD), VNF Forwarding Graph Descriptor (VNFFGD)). Deployment indicates, for example, customizing according to a requirements specification or the like, and disposing in a real usage environment.

The VNF catalog represents a repository of a VNF package. The VNF catalog performs support of creation and management of a VNF package such as a VNF Descriptor (VNFD), a software image, a manifest file or the like.

The NFV instance Repository holds all VNF and all network service (NS) instance information. The VNF instances and NS instances are described in VNF and NS records respectively. These records are updated to reflect execution results of VNF lifecycle management operations and NS lifecycle management operations, by respective instance lifecycles.

The NFVI Resources Repository holds available/reserved/allocated resource information, extracted by a VIM, across operator infrastructure domain.

In FIG. 1, reference point Os-Ma-nfvo is a reference point between OSS (Operation Service Systems)/BSS (Business Service Systems) and NFVO, and is used in a network service lifecycle management request, a VNF lifecycle management request, forwarding of NFV related state information, exchange of policy management information, and the like.

Reference point Vi-Vnfm is used for resource allocation requests from the VNFM, virtualized resource configuration and exchange of state information.

Reference point Ve-Vnfm-em is used between EM and VNFM for VNF instantiation, VNF instance search, updating, terminating, scaling out/in, scaling up/down, configuring from EM to VNFM, event forwarding, configuring VNF from VNFM to VNF, event notification, and the like.

Reference point Ve-Vnfm-vnf is used between VNF and VNFM for VNF instantiation, VNF instance search, updating, terminating, scaling out/in, scaling up/down, configuring from VNF to VNFM, event forwarding, configuring VNF from VNFM to VNF, event notification, and the like.

Reference point Nf-Vi is used in VM allocation along with designation of computing/storage resources, updating of VM resource allocation, VM migration, VM termination, creation/removal of connection between VMs, allocation of virtualized resources for resource allocation requests, forwarding of virtualized resource state information, configuration of hardware resources, exchange of state information, and the like.

Reference point Vn-Nf represents execution environment provided to VNF by NFVI.

Reference point Or-Vnfm is used in resource related requests (authentication, reservation, allocation and the like) by a VNF-Manager (VNFM), forwarding of configuration information to the VNFM, and collection of VNF state information.

Reference point Or-Vi is used in resource reservation by NFVO, allocation requests and virtualized resource configuration and state information exchange (for details, refer to Non-Patent Literature 1).

FIG. 2 refers to FIG. 6.2 (Information elements in different context) on page 40 in Non-Patent Literature 1. Instantiation input parameters are inputted.

In FIG. 2, a Network Service Descriptor (NSD) is a Network Service deployment template that references another descriptor describing a part forming a portion of the network service (NS).

The VNF Descriptor (VNFD) is a deployment template describing a VNF from the viewpoint of a request for deployment and an operation action.

The VNDF is mainly used by the VNFM in VNF instantiation and lifecycle management of a VNF instance. The VNFD is used in management and orchestration, by the NFVO, of network services, virtualized resources on NFVI (automation of deployment/configuration/management of computer system/middleware/services). Included are connectivity/interface/KPI (Key Performance Indicators) requirements used by NFVO, for virtual link configuration between VNFC instances within an NFVI, or VNF instances, and end points of other network functions.

VNF Forwarding Graph Descriptor (VNFFGD) is a deployment template describing network service topology or a part thereof, by referring to VNF, PNF or Virtual Links connecting these.

The Virtual Link Descriptor is a deployment template describing resource requirements necessary for links between VNFs available in the NFVI, PNFs, or NS endpoints.

A Physical Network Function Descriptor (PNFD) describes virtual link connectivity to attached physical network functions, interface, and KPI requirements. This is necessary when a physical device is built into an NS, and facilitates network extension.

NSD, VNFFGD, VLD are included in the NS catalog, and VNFD included as a VNF package in the VNF.

NS or VNF instantiation operations are executed on the NFVO by an OSS/BSS or a VNFM. As a result of the instantiation operation, a record representing a newly created instance is created. For example, respective records created based on information given by respective descriptors or added runtime information related to component instances provide data for modeling instance state of network service (NS).

Types of created instance records include, for example:
  Network Service Record (NSR),
  VNFFG Record (VNFFGR),
  Virtual Link Record (VLR),
  VNF (Virtualized Network Function) Record (VNFR),
  PNF (Physical Network Function) Record (PNFR).

NSR, VNFR, VNFFGR, VVLR information elements provide a data items set that is necessary for modeling instance state of NS, VNF, VNFFG, VL.

A PNF record forms a portion of an NS, represents an instance related to a PNF existing from before, and includes runtime attribute(s) (connectivity to NFVO) of PNF information. It is to be noted that Tables 1 and 2 below provide summary lists of respective elements of the NFV.

TABLE 1

| Function entity | Description |
|---|---|
| OSS/BSS | Operations/Business Support performed in integrated manner |
| | Multiple EMSs, Orchestrators are arranged in lower layer of OSS/BSS |
| Orchestrator | Orchestration across multiple VIMs |
| | Management of NS (Network Service) deployment templates and VNF packages |
| | Management of NS instantiation, NS lifecycle |
| | Management of VNFM instantiation |
| | Management of VNF instantiation accompanying VNFM adjustment |
| | Approval/permission of NFVI resource request from VNFM |
| | Management of integration/visibiity of NS instances through lifecycle |
| | Management of NS instance-VNF instance relationships, using NFV instance repository |
| | Topology management of NS instances |
| | Automated management of NS instances |
| VNF-Manager | Perform VNF lifecycle management* and event notification management |
| | * Instantiaion, Auto-Scale, Auto-Healing, Update, etc. |
| Virtualized Infrastructure Manager (VIM) | Perform resource management and control of NFV Infrastructure as follows. |
| | Computing, storage, network resource management |
| | Allocation of resources in response to request |
| | Monitoring of fault state of NFV infrastructure |
| | Monitoring of resource information of NFV infrastructure |

TABLE 2

| Function entity | Description |
|---|---|
| Service VNF and Infrastructure Description | Network Service: define template for information necessary for deploying VNF. NSD: template describing requirements and constraint conditions necessary for NS deployment VLD: describe resource requirements for logical links connecting VNF and PNF forming NS VNFGD: template describing logical topology and allocation for NS VNFD: template describing requirements and constraint conditions necessary for VNF deployment PNFD: describe connectivity/external IF/KPI requirements of VLs, with regard to physical network functions |
| NS Catalogue | NS repository Management of NS deployment templates (NSD, VLD, VNFFGD) |
| VNF Catalogue | Description of VNF repository Management of VNF packages (VNFD, software images, manifest files, etc.) |
| NFV Instances Repository | Holds all VNF and all NS instance information All instance information is described in Records All Records are updated according to instance lifecycle |
| NFVI Recources Repository | Holds information about available/reserved/allocated NFVI resources to be abstracted (NFVI resources abstracted by VIM, across Operator's Instrstructure Domain) |
| VNF | Network Function that is virtualized, and indicates VM in which EPC application is installed (example: MME, SGW, PGW, etc.), also is configured by VNF |
| EMS | Performs management of FCAPS of VNF (FCAPS: Fault, Configuration, Accounting, Performance and Security) |
| NFVI | Resource infrastructure in which VNF is executed. Configured from Computing, storage, network. Physical resources abstracted by HyperVisor, abstracted resources managed and controlled by VIM, and provided to VNF. |

[NON-PATENT LITERATURE]

[NPL 1] ETSI GS NFV-MAN 001 V1.1.1 (2014-12) Network Functions Virtualisation (NFV); Management and Orchestration <http://www.etsi.org/deliver/etsi_gs/NFV-MAN/001_099/001/01.01.01_60/gs_NFV-MAN001v010101p.pdf>

SUMMARY

The entire disclosed content of the abovementioned Non-Patent Literature is incorporated herein by reference thereto. The following analysis is given according to the present inventor.

FIG. 3 shows information elements of an NSD table (citing 6.2.1.1 of Non-Patent Literature 1) and information elements of a VNFD table (citing 6.3.1.1 of Non-Patent Literature 1).

Referring to FIG. 3, a parameter vnf_dependency is specified, indicating that an inter-VNF dependency is defined in an NSD specified by an ETSI standardized operation, and on the other hand, a parameter dependency is introduced indicating that an inter-VDU dependency is defined in a VNFD.

However, each of these parameters is specified as a Leaf type; and specifically there is no specification as to how an inter-VNF or an inter-VDU dependency should be defined.

Incidentally, for vendors providing VNFs, there is a need to control the creation sequence of VNF, VM, network, storage and the like, when deploying a VNF. However, according to the NSD and VNFD shown in FIG. 3, there is a problem in that the method of defining the inter-VNF or inter-VDU creation sequence is unclear, and that need cannot be met.

Therefore, there is a problem with regard to enabling control of the creation sequence of VNFs and other elements, or VMs and other elements, when VNFs are deployed. It is an object of the present invention to provide a virtualization management/orchestration apparatus, a virtualization management/orchestration method, and a program, which contribute to solving this problem.

In a first aspect of the present invention, a virtualization management/orchestration apparatus is provided with a Network Function Virtualization Orchestrator (NFVO) that reads a Network Service Descriptor (NSD) provided with an entry defining dependency between a Virtualized Network Function (VNF) and a prescribed element, and creates the VNF and the prescribed element according to the dependency defined in the NSD; and/or is provided with a VNF manager (VNFM) that reads a Virtualized Network Function Descriptor (VNFD) provided with an entry defining dependency between a Virtual Machine (VM) and a prescribed element, and creates the VM and the prescribed element according to the dependency defined in the VNFD.

In a second aspect of the present invention, a virtualization management/orchestration method includes: reading a Network Service Descriptor (NSD) provided with an entry defining dependency between a Virtualized Network Function (VNF) and a prescribed element, and/or a Virtualized Network Function Descriptor (VNFD) provided with an entry defining dependency between a Virtual Machine (VM) and a prescribed element; and creating the VNF and the prescribed element in accordance with the NSD, and/or creating the VM and the prescribed element in accordance with the VNFD.

In a third aspect of the present invention, a virtualization management/orchestration program executes on a computer: a process of reading a Network Service Descriptor (NSD) provided with an entry defining dependency between a Virtualized Network Function (VNF) and a prescribed element, and/or a Virtualized Network Function Descriptor (VNFD) provided with an entry defining dependency between a Virtual Machine (VM) and a prescribed element; and a process of creating the VNF and the prescribed element in accordance with the NSD, and/or creating the VM and the prescribed element in accordance with the VNFD. It is to be noted that the program may be provided as a program product recorded on a non-transitory computer-readable storage medium.

According to the virtualization management/orchestration apparatus, the virtualization management/orchestration method, and the program, according to the present invention, it is possible to control the creation sequence of VNFs and other elements, or VMs and other elements, when VNFs are deployed.

BRIEF DESCRIPTION OF DRAWINGS

FIG. 5 is a diagram showing an example of information elements of an NSD table, and information elements of a VNFD table, in the first exemplary embodiment.

PREFERRED MODES

First Exemplary Embodiment

A description is given concerning a virtualization management/orchestration apparatus according to a first exemplary embodiment, making reference to the drawings.
<Configuration>

Figure 4:
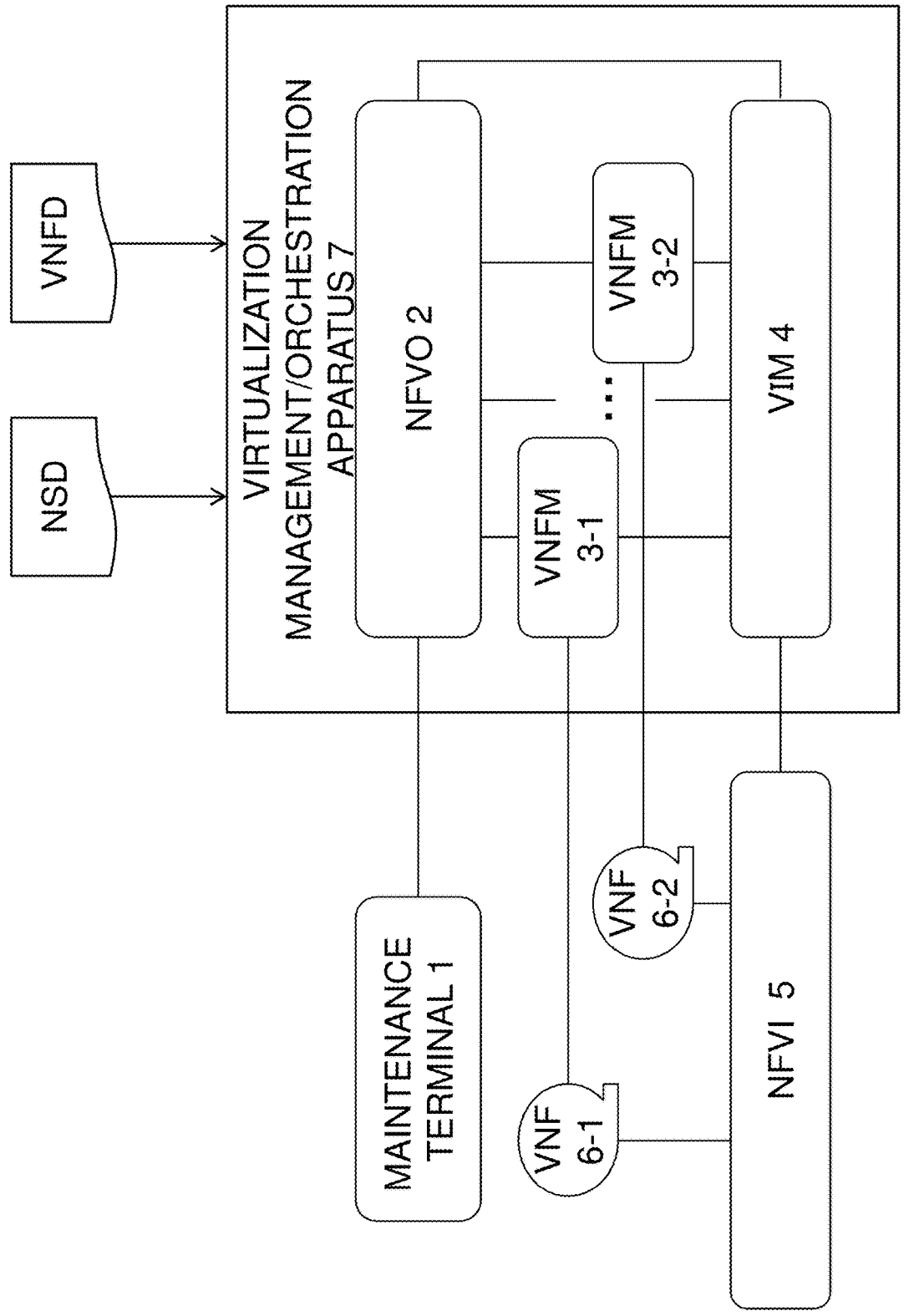
FIG. 4 is a block diagram showing an example of a configuration of a virtualization management/orchestration apparatus according to a first exemplary embodiment.

FIG. 4 is a block diagram showing an example of a configuration of the virtualization management/orchestration apparatus according to the present exemplary embodiment. Referring to FIG. 4, the virtualization management/orchestration apparatus 7 is provided with an NFVO 2, VNFMs 3-1, 3-2, and a VIM 4 and a VNF 6. The virtualization management/orchestration apparatus 7 receives an NSD and a VNFD as input. In addition, FIG. 4 shows VNFs 6-1, 6-2, and NFVI 5, along with a maintenance terminal 1 that transmits requests (for example, a station establishment request) to the NFVO 2.

The NFVO 2, the VNFMs 3-1, 3-2 and the VIM 4 each have functions shown in the abovementioned Table 1. Meanwhile, the VNFs 6-1, 6-2 and the NFVI 5 each have functions shown in the abovementioned Table 2. In particular, in the configuration shown as an example in FIG. 4, the VNFMs 3-1 and 3-2 perform lifecycle management and event notification for the VNFs 6-1 and 6-2.

It is to be noted that the number of VNFMs and of VNFs shown in FIG. 4 are merely exemplary, and the present invention is not limited to modes shown in the drawings. Below, in a case where there is no need to distinguish between the VNFMs 3-1 and 3-2, the general term VNFM 3 is used, and similarly, in a case where there is no need to distinguish between the VNFs 6-1 and 6-2, the general term VNF 6 is used.

FIG. 5 is a diagram showing an example of information elements of an NSD, and information elements of a VNFD, in the first exemplary embodiment. Referring to FIG. 5, the NSD has a newly provided entry that defines a dependency between a VNF and a prescribed element. Specifically, by changing the type of the vnf_dependency of the NSD shown in FIG. 3 from Leaf to Element, it is possible to define the VNF and an element (for example, another VNF, an external NW, storage, or the like) having a dependency with the relevant VNF. Furthermore, as nsd:vnf_dependency, a VNF for which a dependency is to be defined, a VNF to be created before creating the relevant VNF, an external NW and storage can be respectively defined as createVNF, targetVNF, targetENW and targetSTR.

Referring to FIG. 5, the VNFD has a newly provided entry that defines a dependency between a VM and a prescribed element. Specifically, by changing the type of the dependency of the VNDF shown in FIG. 3 from Leaf to Element, it is possible to define a VM and an element (for example, another VM, an external NW, an inter-VNFC NW, storage, or the like) having a dependency with the VM. Furthermore, as vndf:dependency, a VM for which a dependency is to be defined, a VM to be created before creating the relevant VM, an external NW an inter-VNFC NW, and storage can be respectively defined as createVM, targetVM, targetENW, targetVL and targetSTR.

It is to be noted that the dependences shown in FIG. 5 are merely examples. For example, with regard to a NSD, instead of enabling the definition of a VNF to be created before creation of a VNF, it is possible to define a VNF to be created after creation of a VNF. Elements enabling the definition of a dependency with other elements are not limited to the VNF and VM shown in FIG. 5, and it is possible to define a dependency with another element for other elements also. That is, it is possible to define not only a dependency of a VNF and other elements or a dependency of a VM and other elements, but also a dependency of a VDU and other elements, and dependency of a VNFC and other elements. Furthermore, a combination of elements having dependencies is not limited to the combination shown in FIG. 5. For example, the element enabling the definition of a dependency of a VNF or VM is not limited to the VNF, VM, external NW, storage or the like.

The NFVO 2 reads the NSD shown in FIG. 5, and creates an element defining the VNF and a dependency of the relevant VNF, in accordance with the dependency defined in the NSD. In a case where plural dependencies are defined in the NSD, the NFVO 2 confirms whether or not there is a constraint violation among these dependencies. Meanwhile the VNFM 3 reads the VNFD shown in FIG. 5 and creates an element defining the VM and a dependency of the relevant VM, in accordance with the dependency defined in the VNFD. In a case where plural dependencies are defined in the VNFD, the VNFM 3 confirms whether or not there is a constraint violation among these dependencies. Here, in a case where it is possible to satisfy any of the plural dependencies (compatible), it is said that there is no constraint violation, and otherwise, that there is a constraint violation.

<Operations>

Figure 6:
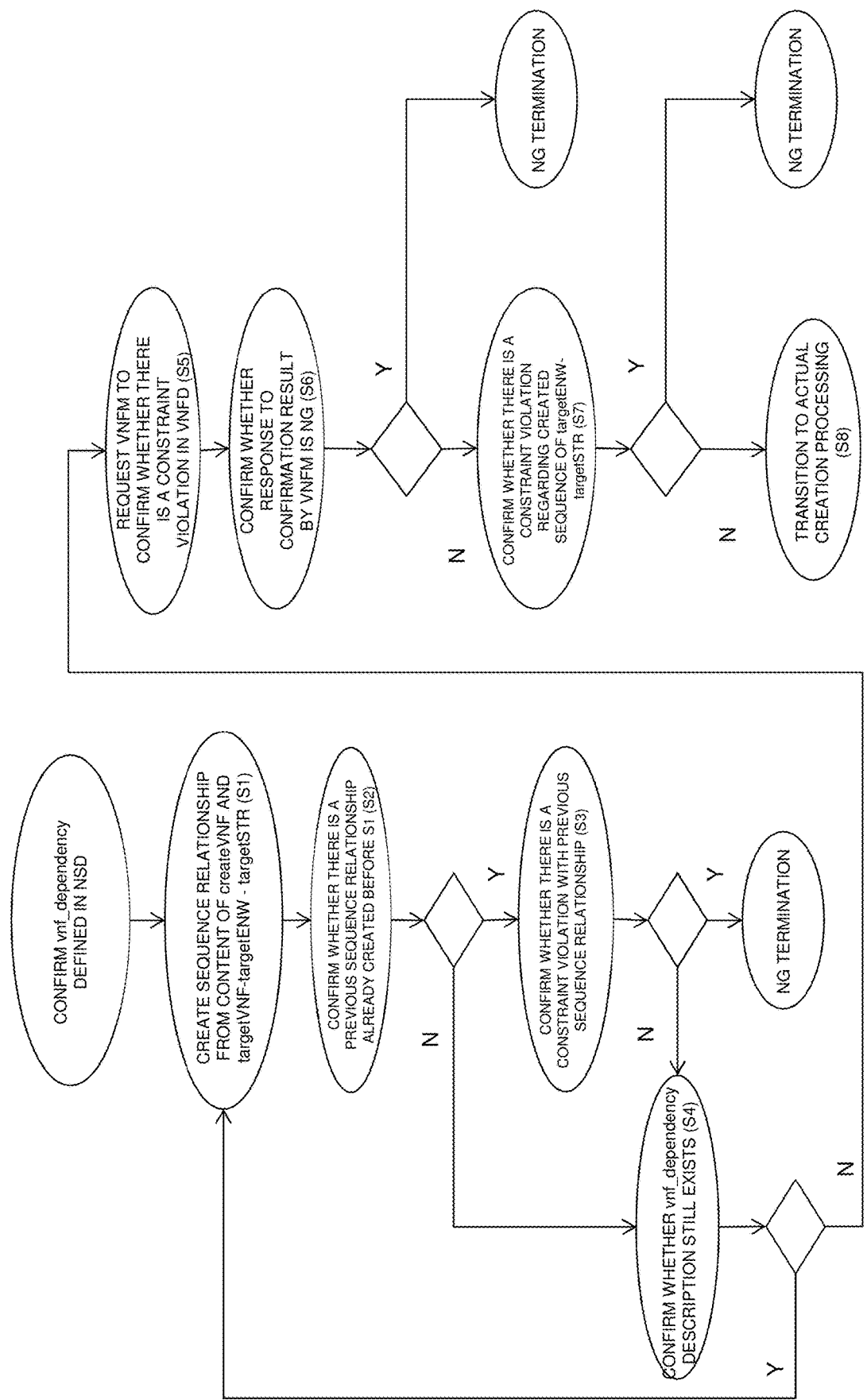
FIG. 6 is a flow diagram showing an example of an NSD confirmation operation by an NFVO in the first exemplary embodiment.

FIG. 6 is a flow diagram showing an example of operations in which the NFVO 2 confirms the vnf_dependency defined in the NSD. Referring to FIG. 6, the NFVO 2 refers to the vnf_dependency defined in the NSD, and creates a sequence relationship representing a sequence of creating these elements, in accordance with the content of createVNF, targetVNF, targetENW and targetSTR (Step S1).

Here, the NFVO 2 confirms whether or not there is a sequence relationship already created before Step S1 (Step S2).

In a case of there being an already created sequence relationship (Y in Step S2), a confirmation is made as to whether or not there is a constraint violation between already created sequence relationships and the sequence relationship created in Step S1 (Step S3).

In a case of a constraint violation (Y in Step S3), an NG termination occurs. On the other hand, in a case where there is no constraint violation (N in Step S3), and a case where there is no sequence relationship already created before Step S1 (N in Step S2), the NFVO 2 confirms whether or not another vnf_dependency is defined in the NSD (Step S4).

In a case where another vnf_dependency is defined (Y in Step S4), control returns to Step S1. In other cases (N in Step S4), the NFVO 2 requests, to VNFM, confirmation as to whether or not there is a constraint violation in a dependency defined in the VNFD (Step S5). In a case where it is confirmed that there is a constraint violation in the VNFD, the VNFM 3 gives a response of NG to the NFVO 2.

The NFVO 2 confirms the response from the VNFM 3 (Step S6). If the response from the VNFM 3 is NG (Y in Step S6), an NG termination occurs. In other cases (N in Step S6), the NFVO 2 confirms whether or not there is a constraint violation regarding sequence of creating targetENW, targetSTR (Step S7).

In a case of a constraint violation (Y in Step S7), an NG termination occurs. On the other hand, in a case where there is no constraint violation (N in Step S7), control transitions to a process of creating respective elements, in accordance with the created sequence relationship (Step S8).

Figure 7:
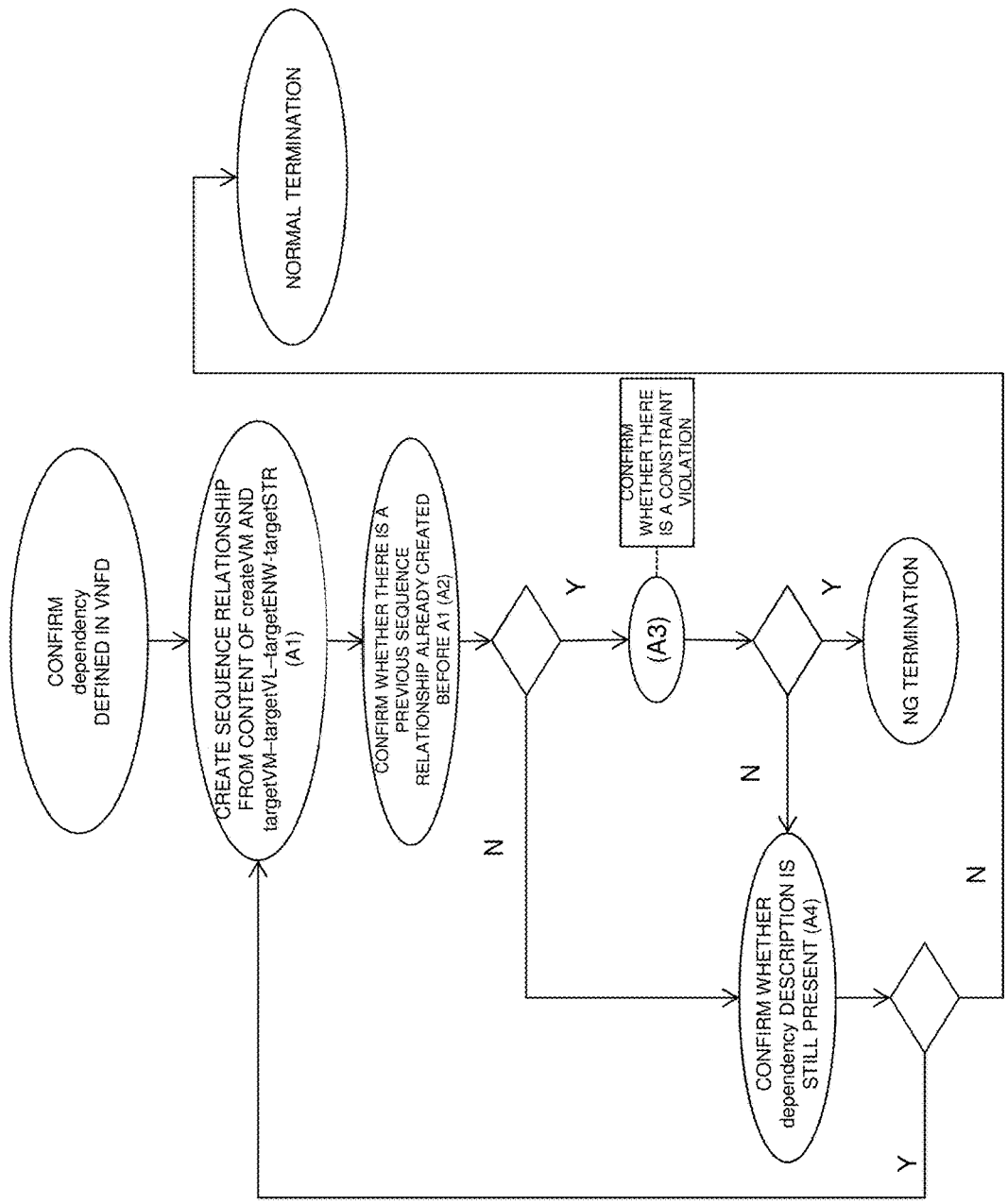
FIG. 7 is a flow diagram showing an example of a VNFD confirmation operation by a VNFM in the first exemplary embodiment.
Figure 8:
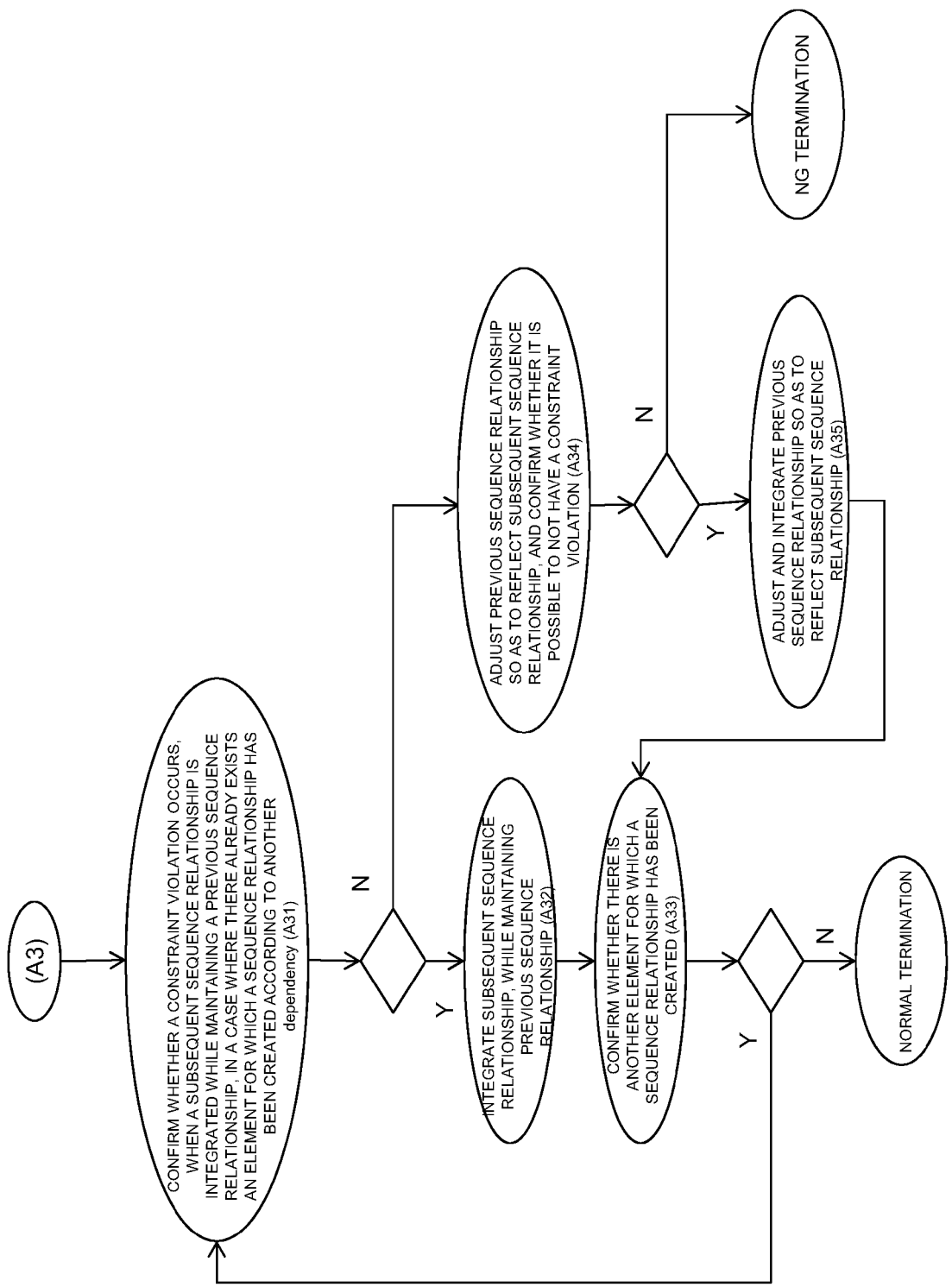
FIG. 8 is a flow diagram showing an example of a VNFD confirmation operation by a VNFM in the first exemplary embodiment.

FIG. 7 and FIG. 8 are flow diagrams showing examples of a VNFD confirmation operation by the VNFM 3. Referring to FIG. 7, the VNFM 3 refers to a dependency defined in the VNFD, and creates a sequence relationship representing a sequence of creating these elements, in accordance with the content of createVM, targetVM, targetVL, targetENW and targetSTR (Step A1).

Here, the VNFM 3 confirms whether or not there is a sequence relationship already created before Step A1 (Step A2).

In a case of there being an already created sequence relationship (Y in Step A2), a confirmation is made as to whether or not there is a constraint violation between the already created sequence relationship and the sequence relationship created in Step A1 (Step A3). Details of processing in Step A3 are described later making reference to FIG. 8.

In a case of a constraint violation (Y in Step A3), an NG termination occurs. On the other hand, in a case where there is no constraint violation (N in Step A3), and in a case where there is no sequence relationship already created before Step A1 (N in Step A2), the VNFM 3 confirms whether or not another dependency is defined in the VNFD (Step A4).

In a case where another dependency is defined (Y in Step A4), control returns to Step A1. In other cases (N in Step A4), a normal termination occurs.

FIG. 8 is a flow diagram showing details of an example of Step A3 of FIG. 7. Referring to FIG. 8, in a case where there is an element in which a sequence relationship has already been created in accordance with another dependency, when a sequence relationship (referred to as "subsequent sequence relationship") created in Step A1 of FIG. 7 is integrated while maintaining sequence relationships (referred to as "previous sequence relationship") already created before Step A1, the VNFM 3 confirms whether or not a constraint violation occurs (Step A31).

In a case where a constraint violation does not occur when the subsequent sequence relationship is integrated with the previous sequence relationship, while maintaining the previous sequence relationship (Y in Step A31), the VNFM 3 integrates the subsequent sequence relationship with the previous sequence relationship while maintaining the previous sequence relationship (Step A32). Next, the VNFM 3 confirms whether or not there exists another element in which a sequence relationship is created in accordance with another dependency (Step A33); if it exists (Y in Step A33), control returns to Step A31; and in other cases (N in Step A33), normal termination occurs.

On the other hand, in a case where a constraint violation occurs when the subsequent sequence relationship is integrated with the previous sequence relationship, while maintaining the previous sequence relationship (N in Step A31), the VNFM 3 adjusts the previous sequence relationship so as to reflect the subsequent sequence relationship, and confirms whether or not the constraint violation can be resolved (Step S34). In a case where the constraint violation can be resolved (Y in Step A34), the VNFM 3 adjusts the previous sequence relationship so as to reflect the subsequent sequence relationship (Step A35), and transitions to Step A33. On the other hand, in a case where the constraint violation cannot be resolved (N in Step S34), an NG termination occurs.

Figure 1:
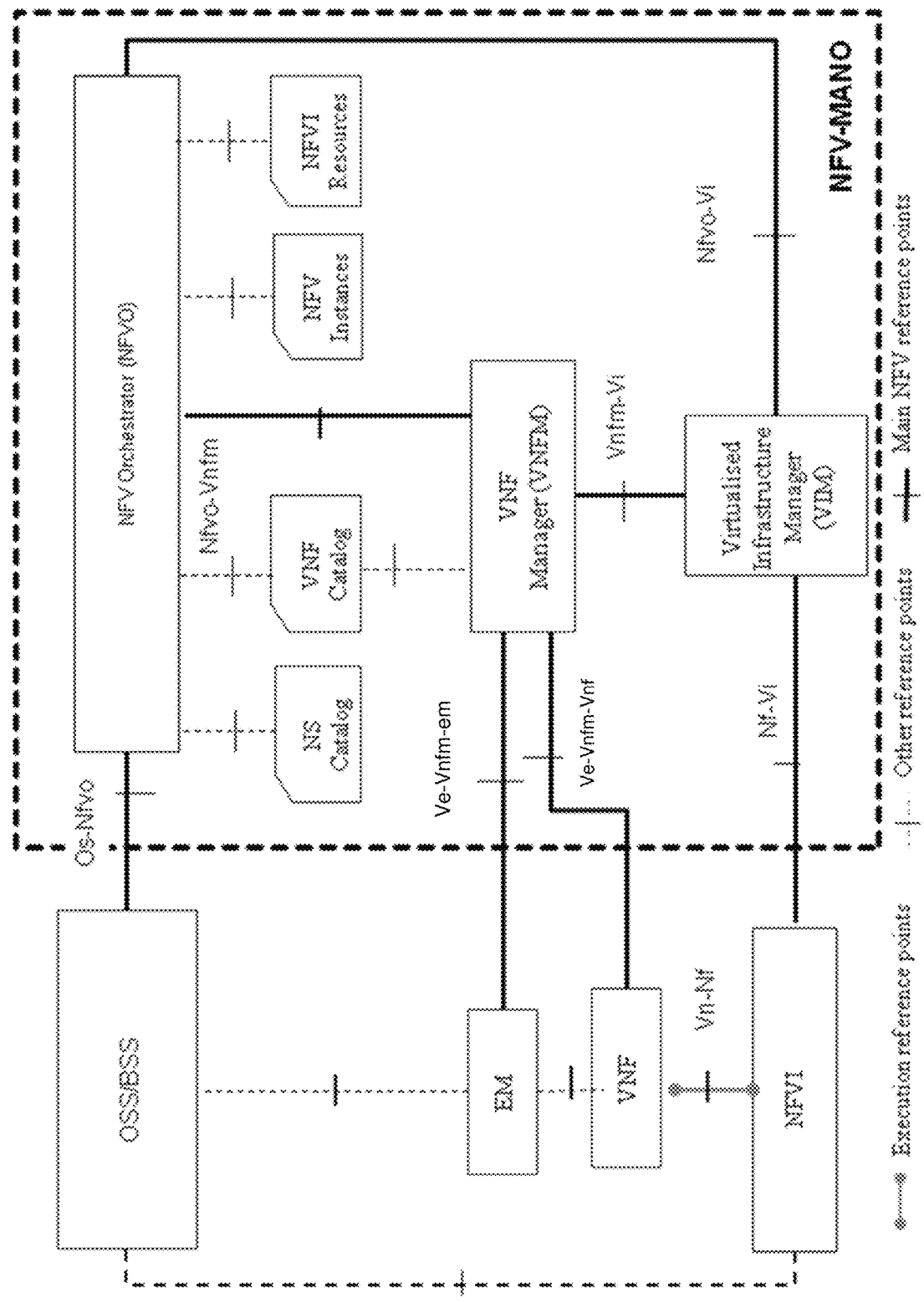
FIG. 1 is a diagram describing NFV-MANO of an NFV architecture (citing FIG. 5.1 of Non-Patent Literature 1).
Figure 2:
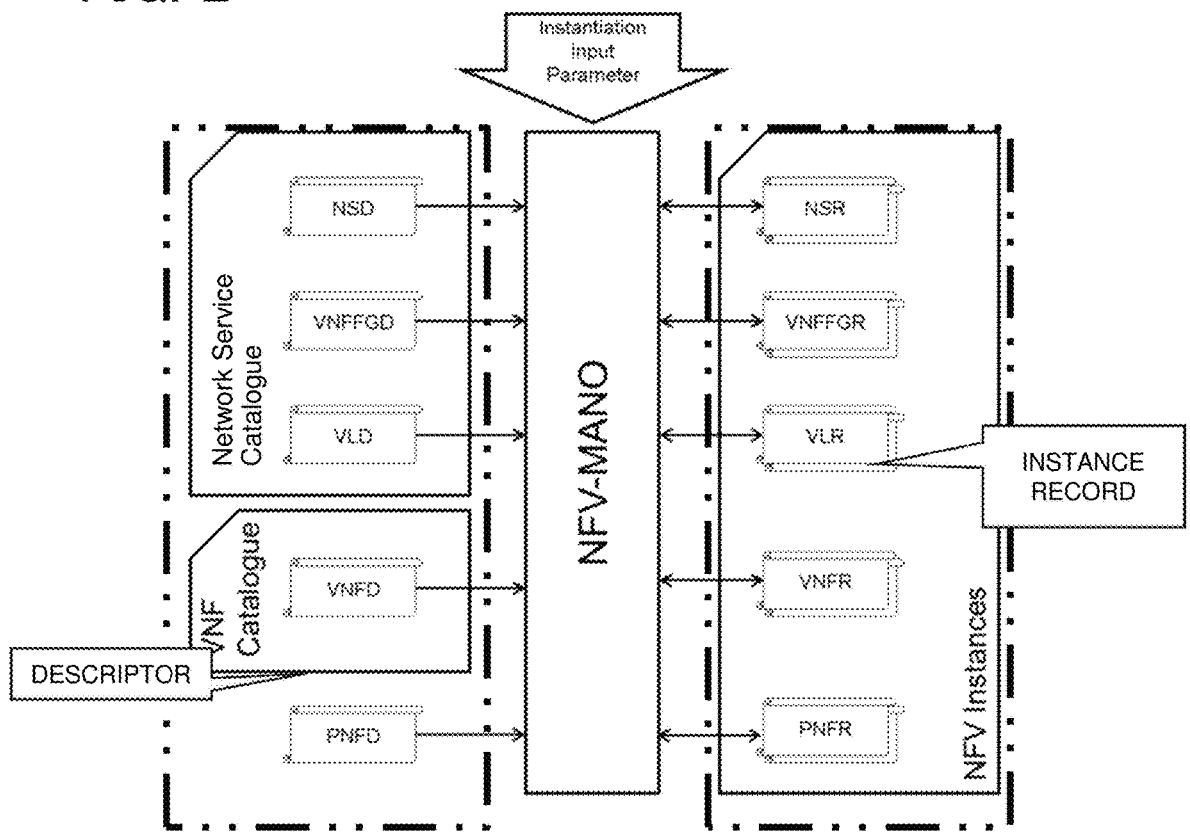
FIG. 2 is a diagram describing a template and instance records according to Non-Patent Literature 1 (citing FIG. 6.2 of Non-Patent Literature 1).
Figure 3:
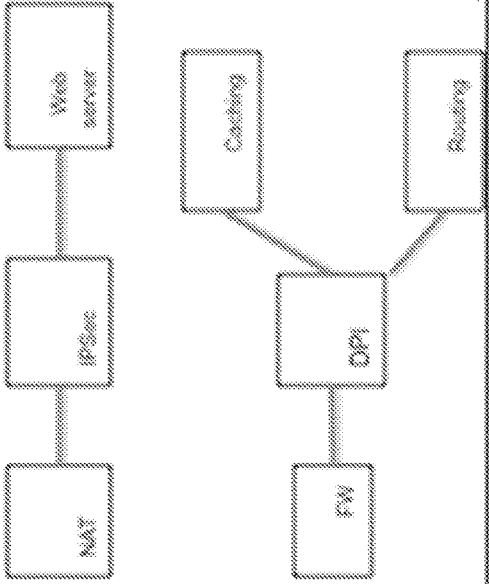
FIG. 3 is a diagram describing information elements of an NSD table (citing 6.2.1.1 of Non-Patent Literature 1) and information elements of a VNFD table (citing 6.3.1.1 of Non-Patent Literature 1).

Here, before specifically describing operations of the present exemplary embodiment, a description is given concerning problem points in a case of using the NSD and the VNFD shown in FIG. 3.

Figure 9:
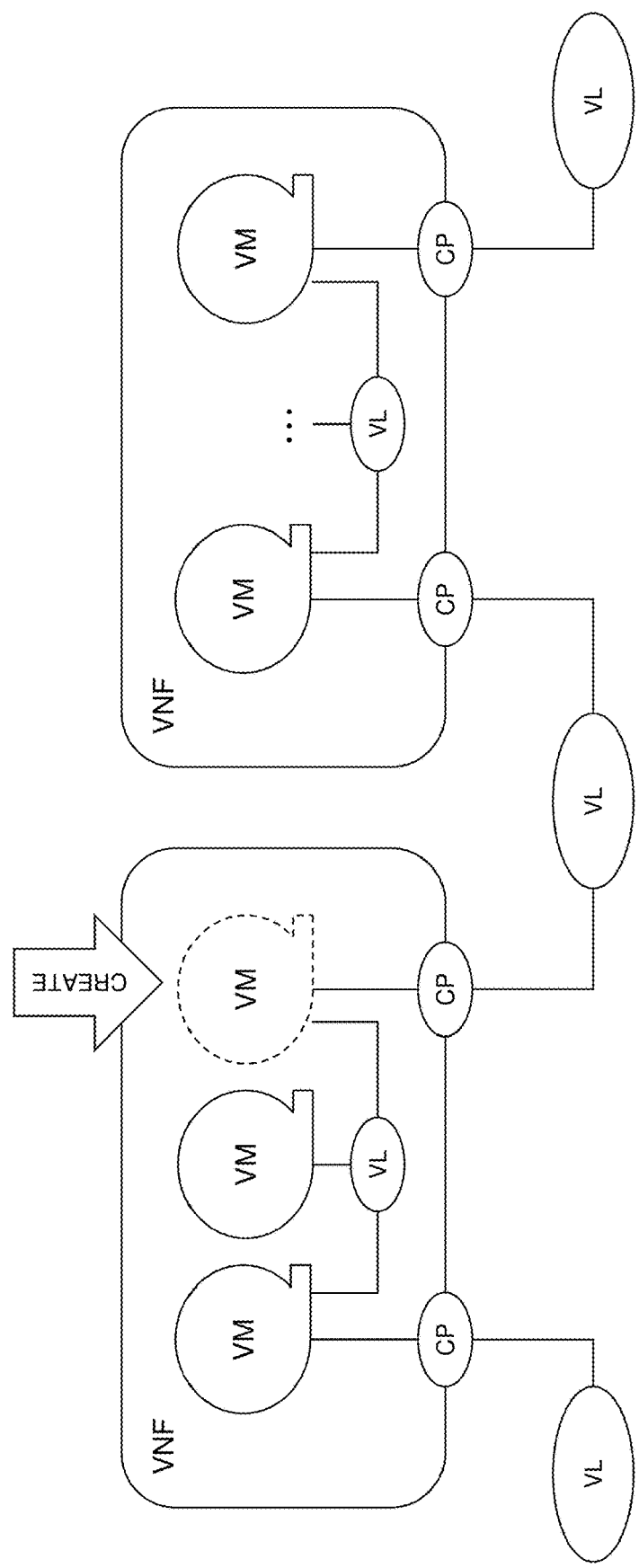
FIG. 9 is a diagram describing a comparative example using the NSD and the VNFD shown in FIG. 3.

FIG. 9 is a diagram describing a problem that occurs when using the NSD and the VNFD shown in FIG. 3. For a vendor providing the VNF, there is a need, until a VM to be created is established and configuration is completed, that the relevant VM not be connected to an external NW. For example, with regard to a particular characteristic of a carrier, in a case of a risk where, until an application is started up after OS (Operation System) startup, communication with the outside is started and a failure occurs, this type of need occurs. Also besides this, in a case where there is a dependency between one VM and another VM, a case may be considered where unless an application is started up in advance in the other VM, a configuration error occurs after creation of the one VM.

Figure 10:
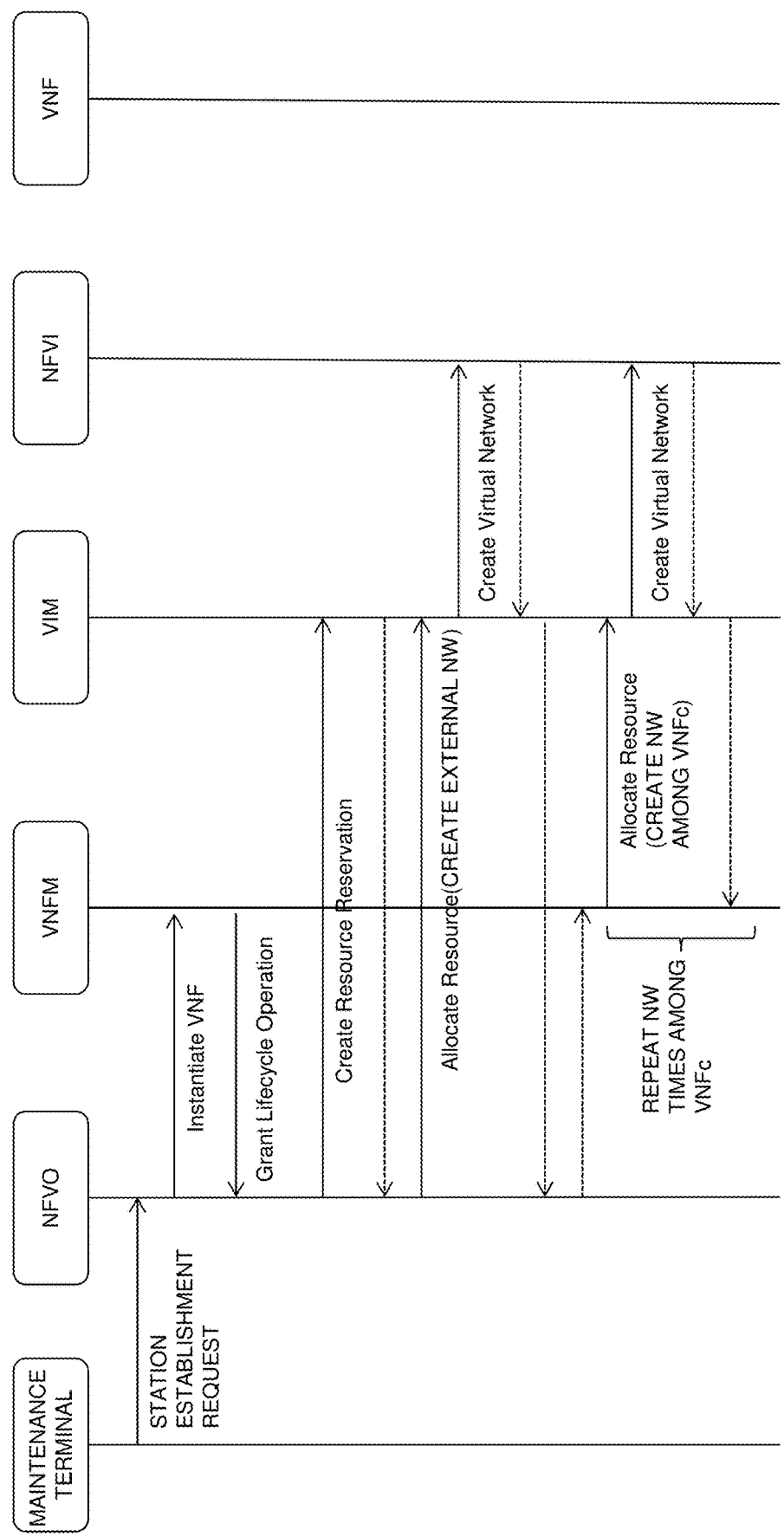
FIG. 10 is a sequence diagram describing operations of a comparative example using the NSD and the VNFD shown in FIG. 3.
Figure 11:
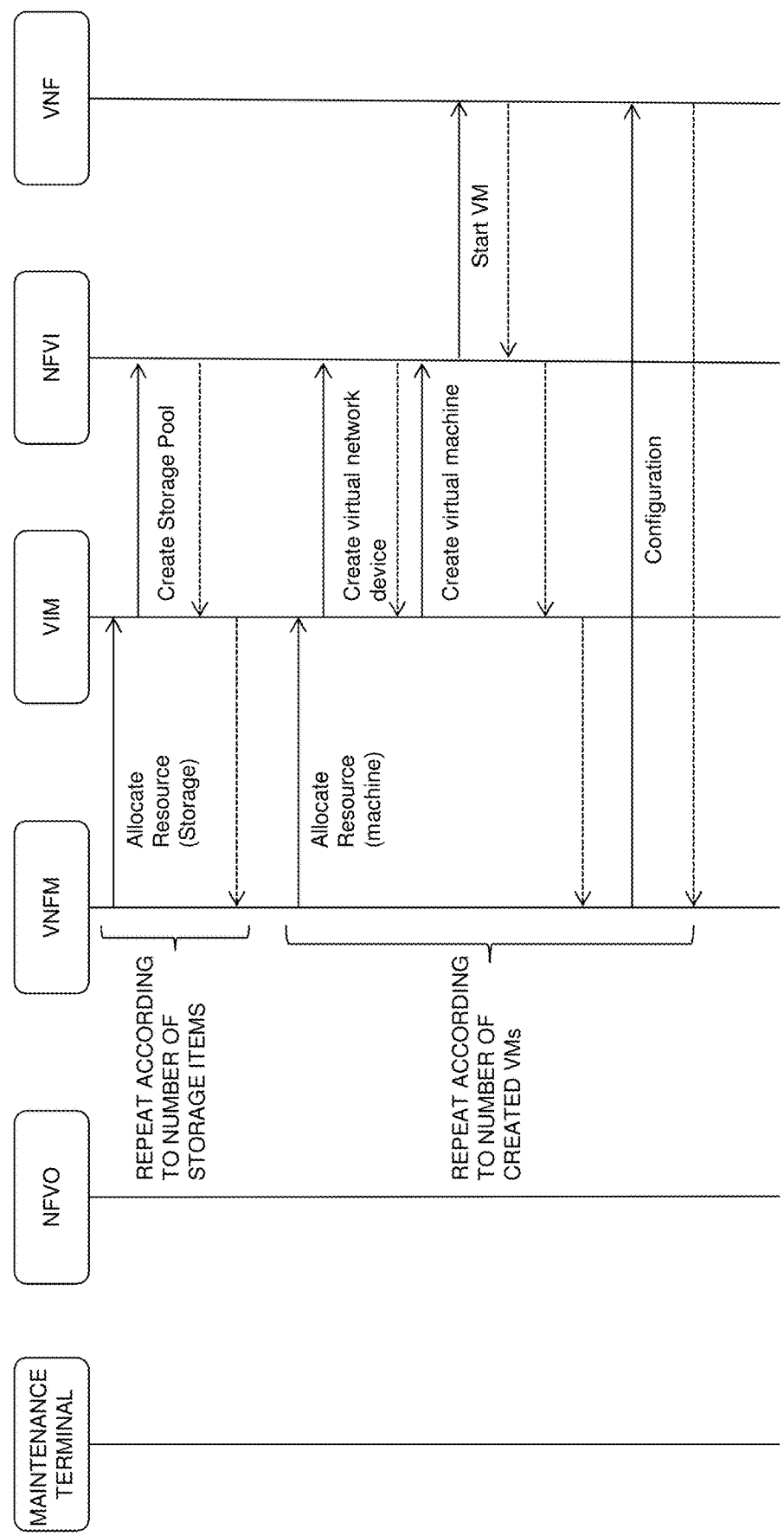
FIG. 11 is a sequence diagram describing operations of a comparative example using the NSD and the VNFD shown in FIG. 3.

FIG. 10 and FIG. 11 are sequence diagrams describing VNF deployment operations when the NSD and the VNFD shown in FIG. 3 are used.

Referring to FIG. 10, a maintenance terminal 1 transmits a station establishment request to the NFVO 2.

Next, the NFVO 2 requests the VNFM 3 to create a VNF instance (Instantiate VNF). Thereupon the VNFM 3 gives permission for a VNF lifecycle operation to the NFVO 2 (Grant Lifecycle Operation).

Next, the NFVO 2 requests the VIM 4 to reserve a virtual resource (Create Resource Reservation).

Next, the NFVO 2 requests the VIM 4 to perform external NW (that is, a network outside of the VNF) allocation (Allocate Resource). Thereupon the VIM 4 requests an NFVI 5 to create a virtual network (Create Virtual Network).

Next, the VNFM 3 requests the VIM 4 to perform allocation of NWs among VNFCs (that is, network inside the VNF) (Allocate Resource). Thereupon the VIM 4 requests the NFVI 5 to create a virtual network (Create Virtual Network). It is to be noted that the request for allocation of the NWs among the VNFCs and the virtual network creation request are repeated in accordance with the number of networks among the VNFCs.

Referring to FIG. 11, next, the VNFM 3 requests the VIM 4 to perform storage allocation (Allocate Resource). Thereupon, the VIM 4 requests the NFVI 5 to create a storage pool (Create Storage Pool).

Next the VNFM 3 requests the VIM 4 to perform VM allocation (Allocate Resource). Thereupon the VIM 4 requests the NFVI 5 to create a virtual network device (Create virtual network device). In addition the VIM 4 requests the NFVI 5 to create a VM (Create virtual machine). Thereupon the NFVI 5 requests the VNF 6 to start up the VM (Start VM). Next, the VNFM 3 requests the VNF 6 to perform VM configuration (Configuration). It is to be noted that processing from requesting VM allocation up to requesting VM configuration is repeated in accordance with the number of created VMs.

According to the deployment sequence of VNFs shown in FIG. 10 and FIG. 11, an external NW is created before the VM is created and configuration of the relevant VM is completed. That is, according to the VNFD shown in FIG. 3, it is not possible to specifically define dependency between the VM and other elements, and it is not possible to control creation sequence of the VM and other elements (network, storage and the like). Therefore, there is a problem in that it is not possible to respond to the demand described with reference to FIG. 9.

<Operations of the Present Exemplary Embodiment>

Next a description is given of operations of the present exemplary embodiment using a specific example of the NSD and the VNFD.

Figure 12:
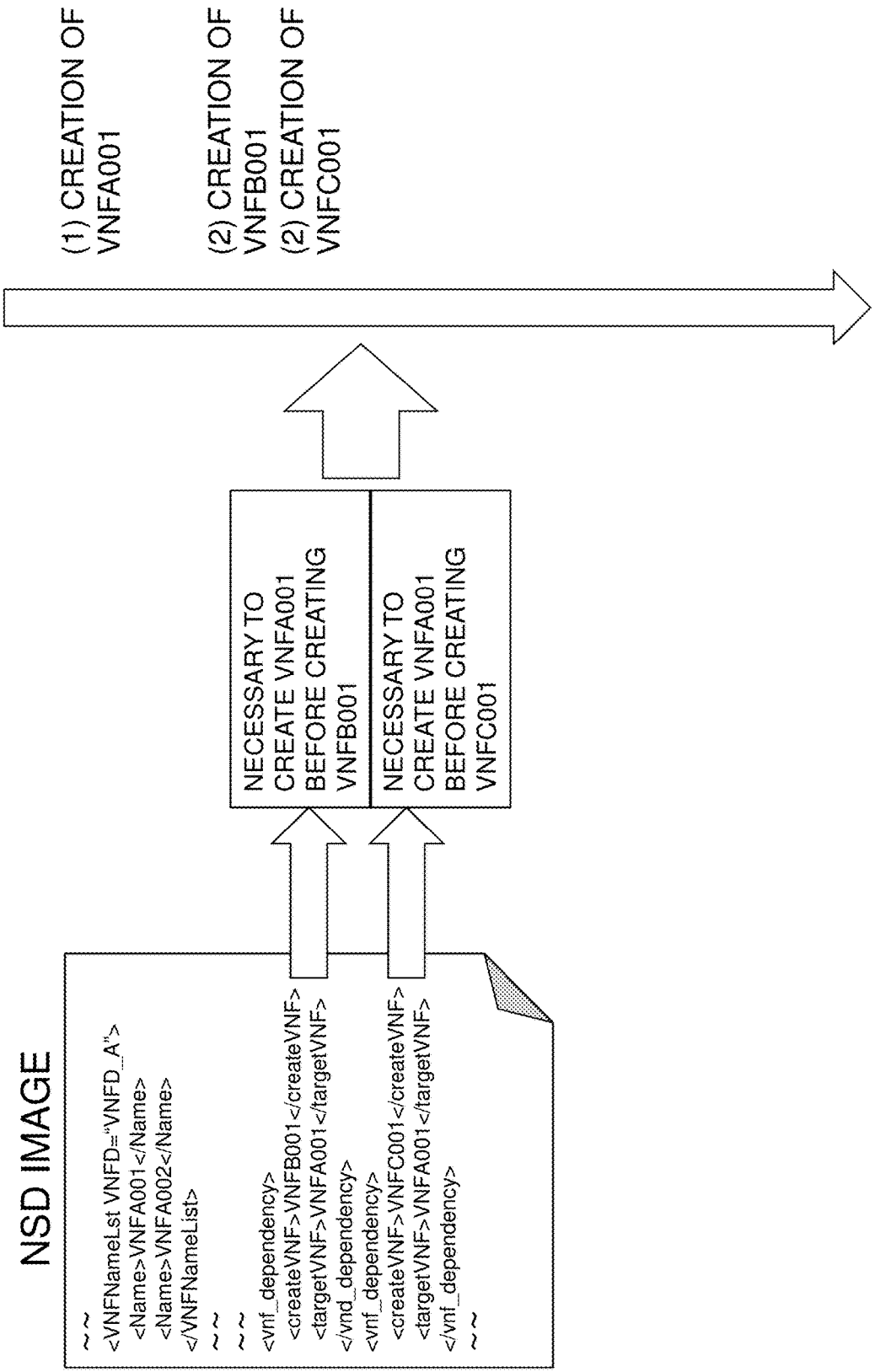
FIG. 12 is a diagram for describing an NSD confirmation operation by an NFVO in the first exemplary embodiment.

FIG. 12 is a diagram for describing NSD confirmation operations by the NFVO 2. Referring to FIG. 12, a dependency of creating VNFA001 before creating a VNFB001 is defined in a (first) vnf_dependency of the NSD. The NFVO 2 creates the sequence relationship "(1) VNFA001, (2) VNFB001" in accordance with the relevant dependency. Here, the sequence relationship is represented by numbers in parentheses. On the other hand, a dependency of creating VNFA001 before creating VNFC001 is created in a (second) vnf_dependency of the NSD. The NFVO 2 creates the sequence relationship of "(1) VNFA001, (2) VNFC001" in accordance with the relevant dependency. In order that there be no constraint violation among these sequence relationships created by NFVO 2, the NFVO 2 takes the VNF creation sequence as "(1) VNFA001, (2) VNFB001, VNFC001". It is to be noted that there is no sequence relationship among elements with the same parenthetic numbers and elements.

Figure 13:
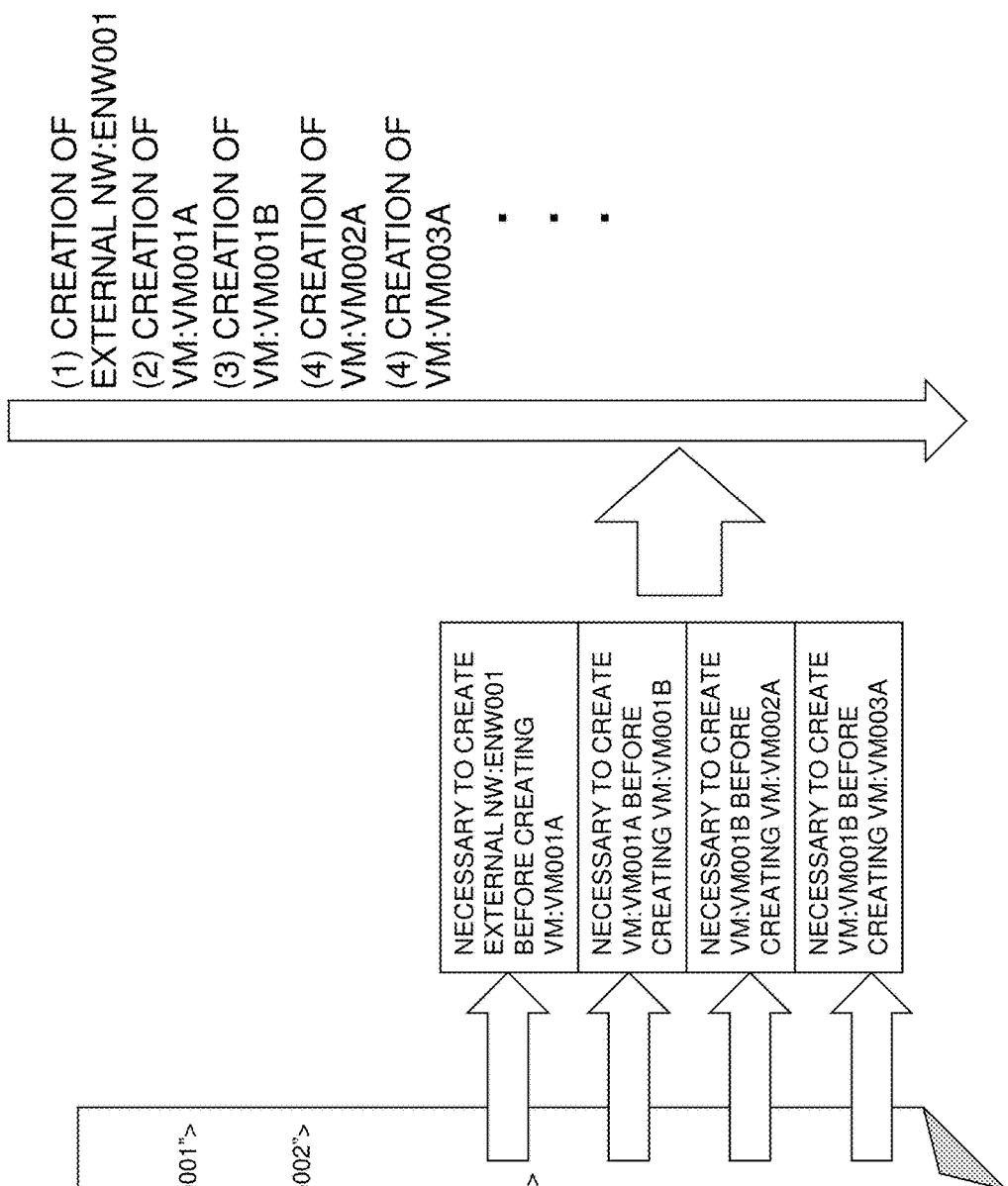
FIG. 13 is a diagram for describing a VNFD confirmation operation by a VNFM in the first exemplary embodiment.
Figure 14:
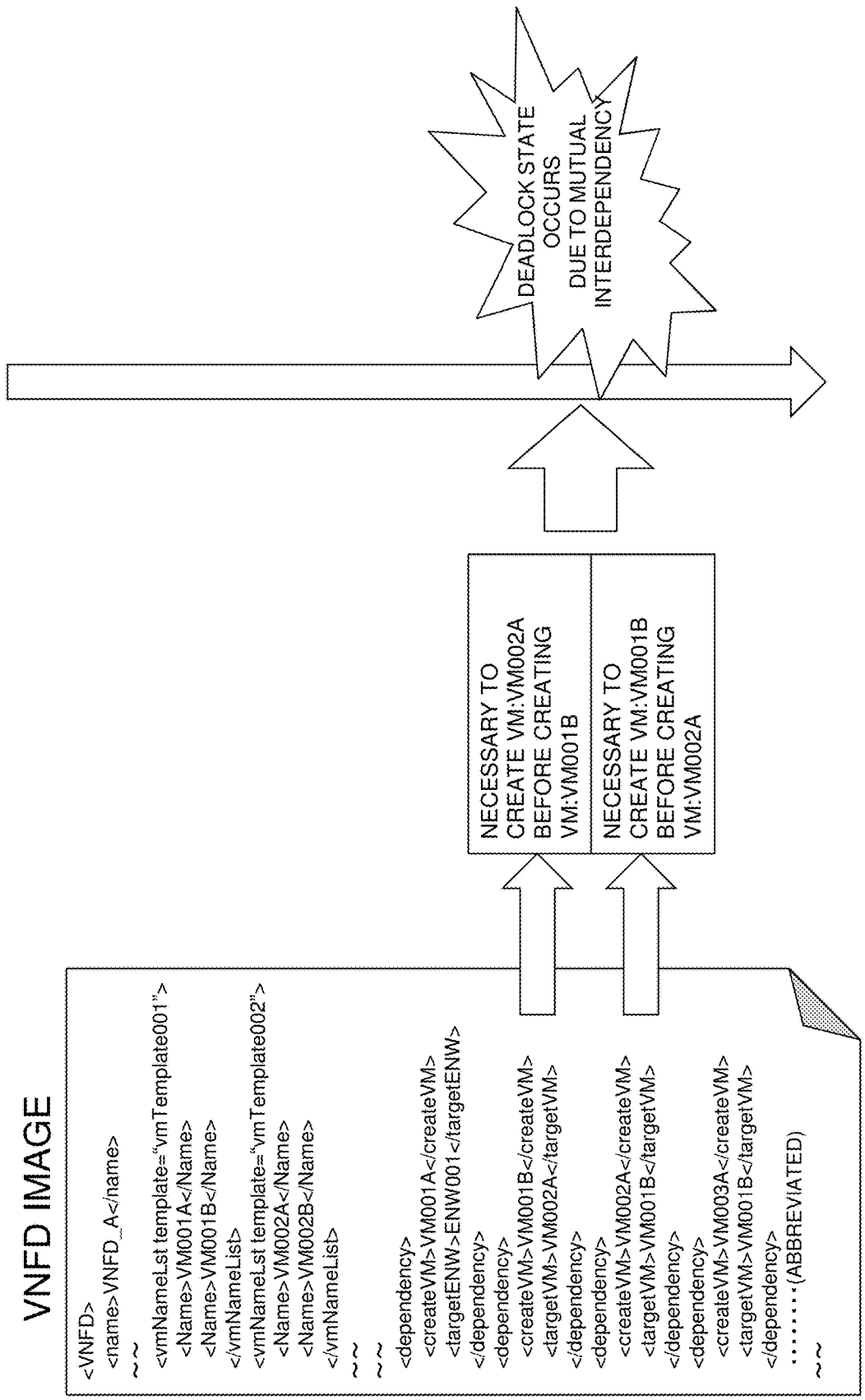
FIG. 14 is a diagram for describing a VNFD confirmation operation by a VNFM in the first exemplary embodiment.

FIG. 13 to FIG. 20 are diagrams for describing VNFD confirmation operations by the VNFM 3. FIG. 13 illustrates a first example, FIG. 14 illustrates a second example, and FIG. 15 to FIG. 20 illustrate a third example.

EXAMPLE 1

Referring to FIG. 13, a (first) dependency of the VNFD has a definition of a dependency of creating an external network ENW001 before creating VM001A. The VNFM 3 creates the sequence relationship of "(1) ENW001, (2) VM001A" in accordance with the relevant dependency. Meanwhile, a (second) dependency of the VNFD has a definition of a dependency of creating VM001A before creating VM001B. The VNFM 3 creates the sequence relationship of "(3) VM001A, (4) VM001B" in accordance with the relevant dependency. In order that there be no constraint violation among the sequence relationships created by VNFM 3, the VNFM 3 takes the VM creation sequence as "(1) ENW001, (2) VM001A, (3) VM001B". A (third) dependency of the VNFD has a definition of a dependency of creating VM001B before creating VM002A. The VNFM 3 creates the sequence relationship of "(4) VM001B, (5) VM002A" in accordance with the relevant dependency. In order that there be no constraint violation between previous sequence relationship created by VNFM 3 and subsequent sequence relationship, the VNFM 3 takes the VM creation sequence as "(1) ENW001, (2) VM001A, (3) VM001B, (4) VM002A". Furthermore, a (fourth) dependency of the VNFD has a definition of a dependency of creating VM001B before creating VM003A. The VNFM 3 creates the sequence relationship of "(5) VM001B, (6) VM003A" in accordance with the relevant dependency. At this time, in order that a constraint violation does not occur when the subsequent sequence relationship is integrated with the previous sequence relationship, while maintaining the previous sequence relationship (Y in Step A3 of FIG. 8), the subsequent sequence relationship is integrated with the previous sequence relationship while maintaining the previous sequence relationship (Step A32 in FIG. 8). That is, the VNFM 3 takes the VM creation sequence as "(1) ENW001, (2) VM001A, (3) VM001B, (4) VM002A, VM003A".

EXAMPLE 2

Referring to FIG. 14, a (second) dependency of the VNFD has a definition of a dependency of creating VM002A before creating VM001B. The VNFM 3 creates the sequence relationship of "(1) VM002A, (2) VM001B" in accordance with the relevant dependency. Meanwhile, a (third) dependency of the VNFD has a definition of a dependency of creating VM001B before creating VM002A. The VNFM 3 creates the sequence relationship of "(3) VM001B, (4) VM002A" in accordance with the relevant dependency. At this time, in order that a constraint violation does not occur, since it is not possible to integrate the previous sequence relationship and subsequent sequence relationship (N in Step S31, N in Step S34 in FIG. 8), the creation of sequence relationship by VNFM 3 has an NG termination.

EXAMPLE 3

Figure 15:
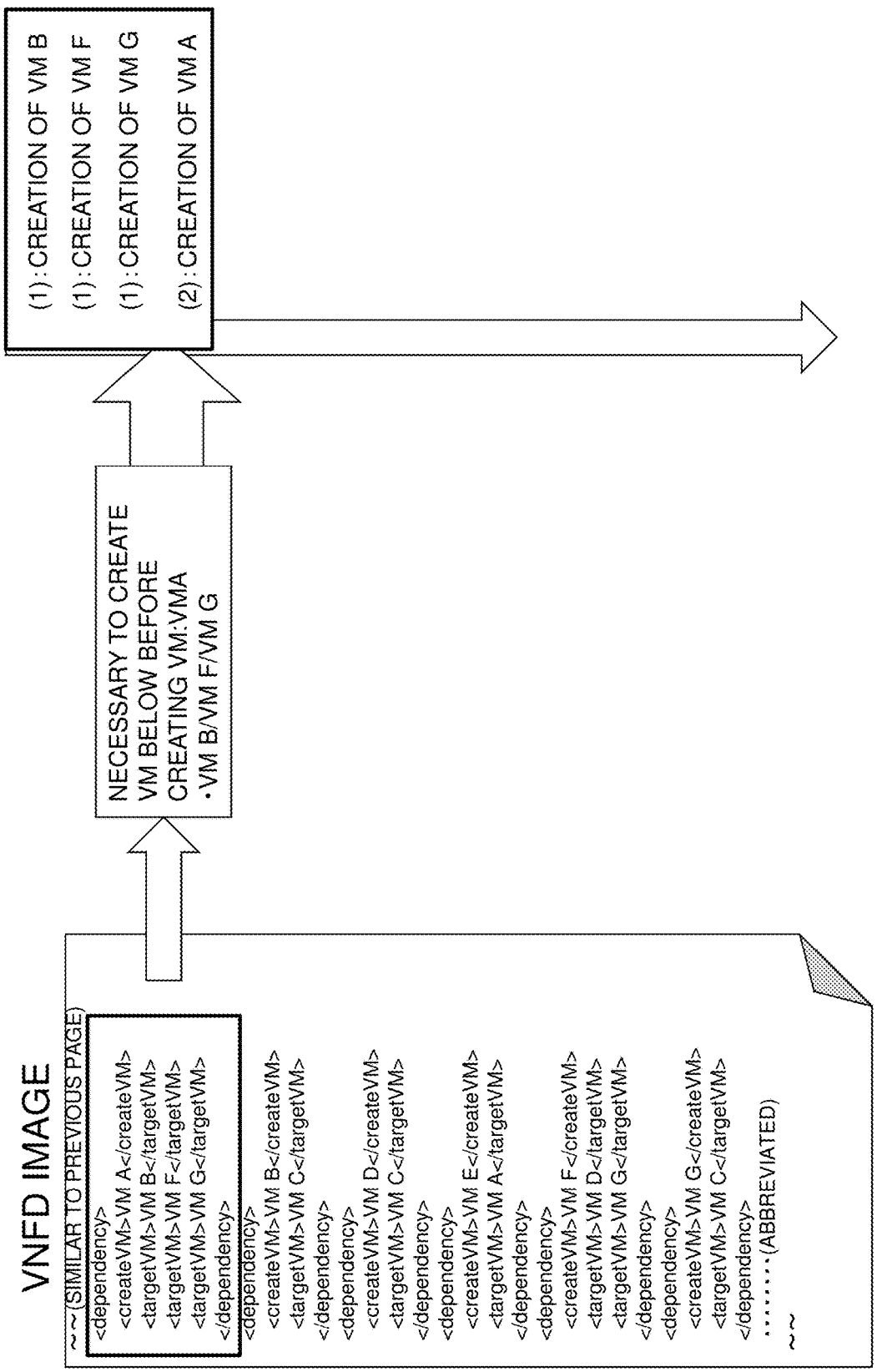
FIG. 15 is a diagram for describing a VNFD confirmation operation by a VNFM in the first exemplary embodiment.

Referring to FIG. 15, a (first) dependency of the VNFD has a definition of a dependency of creating VM_B, VM_F, VM_G before creating VM_A. The VNFM 3 creates the sequence relationship of "(1) VM_B, VM_F, VM_G, (2) VM_A" in accordance with the relevant dependency.

Figure 16:
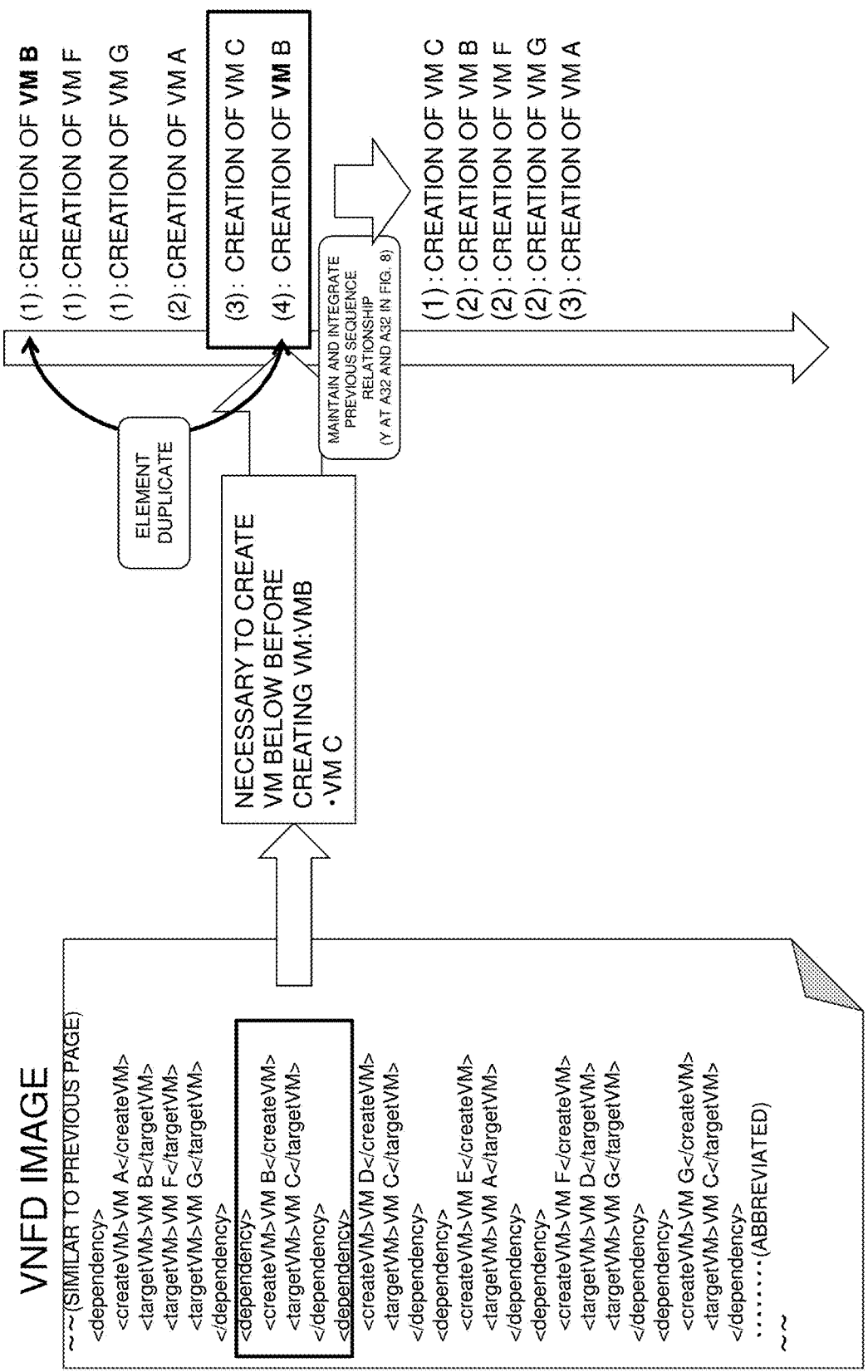
FIG. 16 is a diagram for describing a VNFD confirmation operation by a VNFM in the first exemplary embodiment.

Referring to FIG. 16, a (second) dependency of the VNFD has a definition of a dependency of creating VM_C before creating VM_B. The VNFM 3 creates the sequence relationship of "(3) VM_C, (4) VM_B" in accordance with the relevant dependency. At this time, in order that a constraint violation does not occur when the subsequent sequence relationship is integrated with the previous sequence relationship while maintaining the previous sequence relationship (Y in Step A31 of FIG. 8), the subsequent sequence relationship is integrated with the previous sequence relationship while maintaining the previous sequence relationship (Step A32 in FIG. 8). That is, the VNFM 3 has a VM creation sequence of "(1) VM_C, (2) VM_B, VM_F, VM_G, (3) VM_A".

Figure 17:
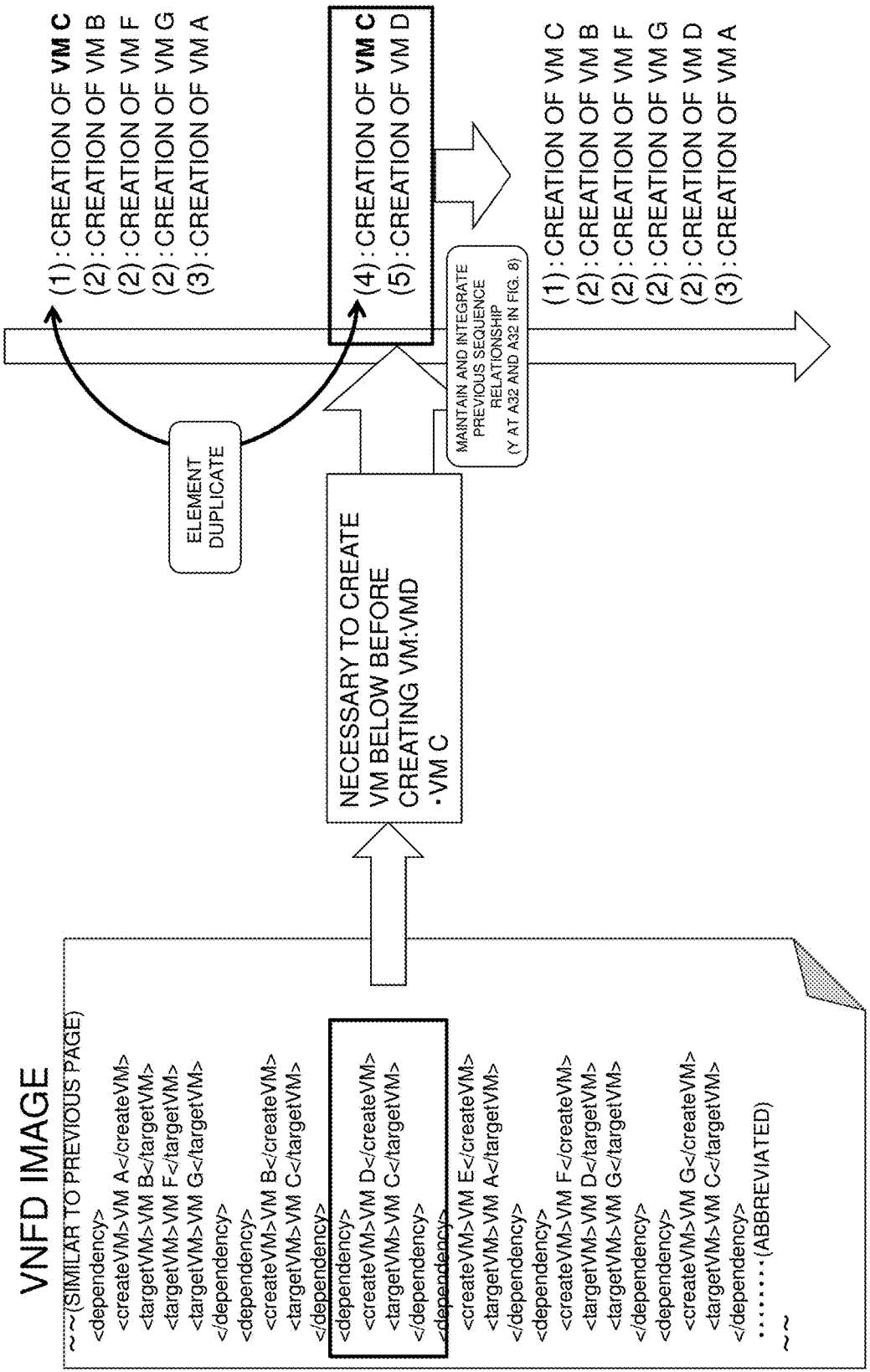
FIG. 17 is a diagram for describing a VNFD confirmation operation by a VNFM in the first exemplary embodiment.

Referring to FIG. 17, a (third) dependency of the VNFD has a definition of a dependency of creating VM_C before creating VM_D. The VNFM 3 creates the sequence relationship of "(4) VM_C, (5) VM_D" in accordance with the relevant dependency. At this time, in order that a constraint violation does not occur when the subsequent sequence relationship is integrated with the previous sequence relationship while maintaining the previous sequence relationship (Y in Step A31 of FIG. 8), the subsequent sequence relationship is integrated with the previous sequence relationship while maintaining the previous sequence relationship (Step A32 in FIG. 8). That is, the VNFM 3 has a VM creation sequence of "(1) VM_C, (2) VM_B, VM_F, VM_G, VM_D, (3) VM_A".

Figure 18:
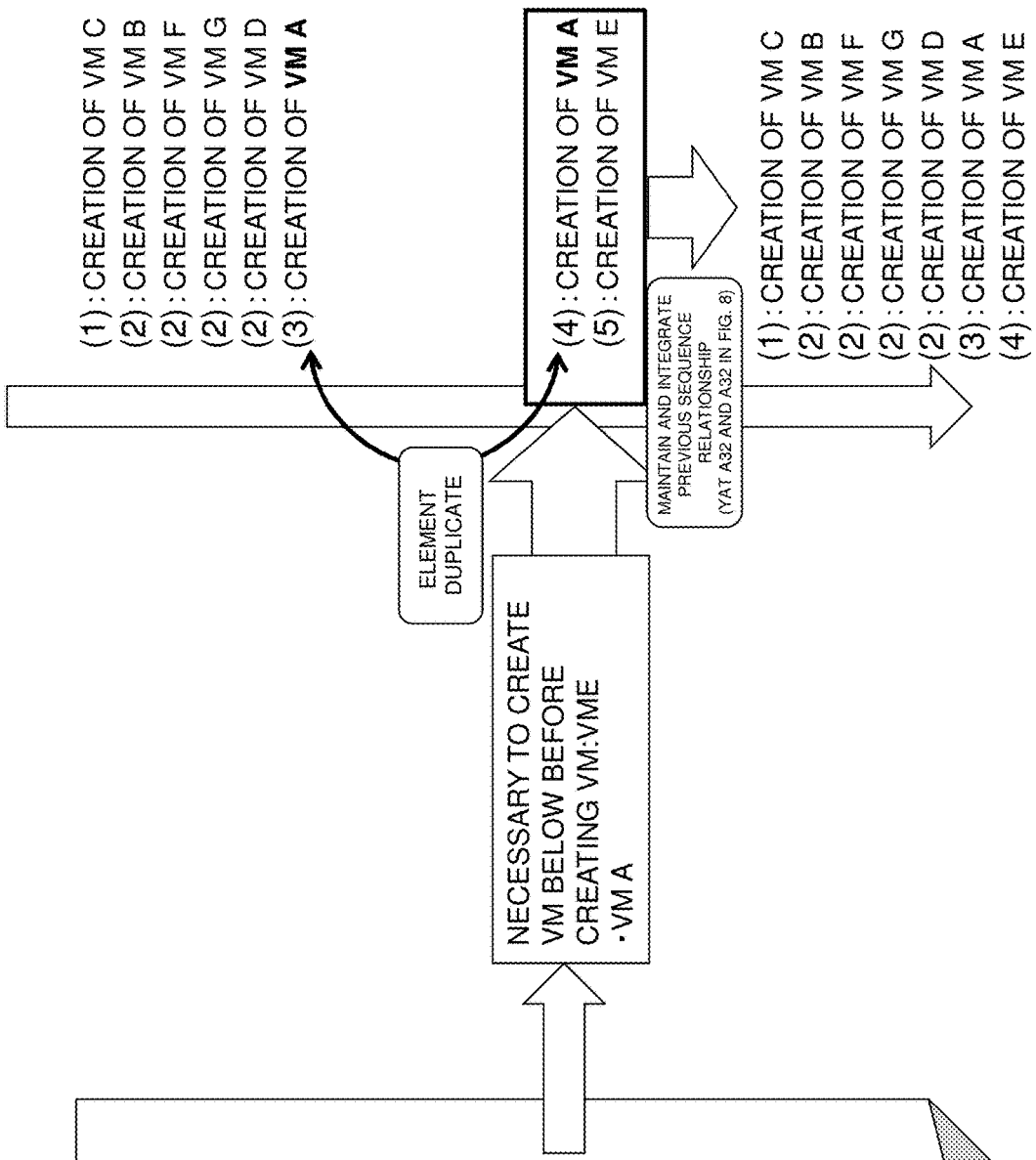
FIG. 18 is a diagram for describing a VNFD confirmation operation by a VNFM in the first exemplary embodiment.

Referring to FIG. 18, a (fourth) dependency of the VNFD has a definition of a dependency of creating VM_A before creating VM_E. The VNFM 3 creates the sequence relationship of "(4) VM_A, (5) VM_E" in accordance with the relevant dependency. At this time, in order that a constraint violation does not occur when the subsequent sequence relationship is integrated with the previous sequence relationship while maintaining the previous sequence relationship (Y in Step A31 of FIG. 8), the subsequent sequence relationship is integrated with the previous sequence relationship while maintaining the subsequent sequence relationship (Step A32 in FIG. 8). That is, the VNFM 3 has a VM creation sequence of "(1) VM_C, (2) VM_B, VM_F, VM_G, VM_D, (3) VM_A, (4) VM_E".

Figure 19:
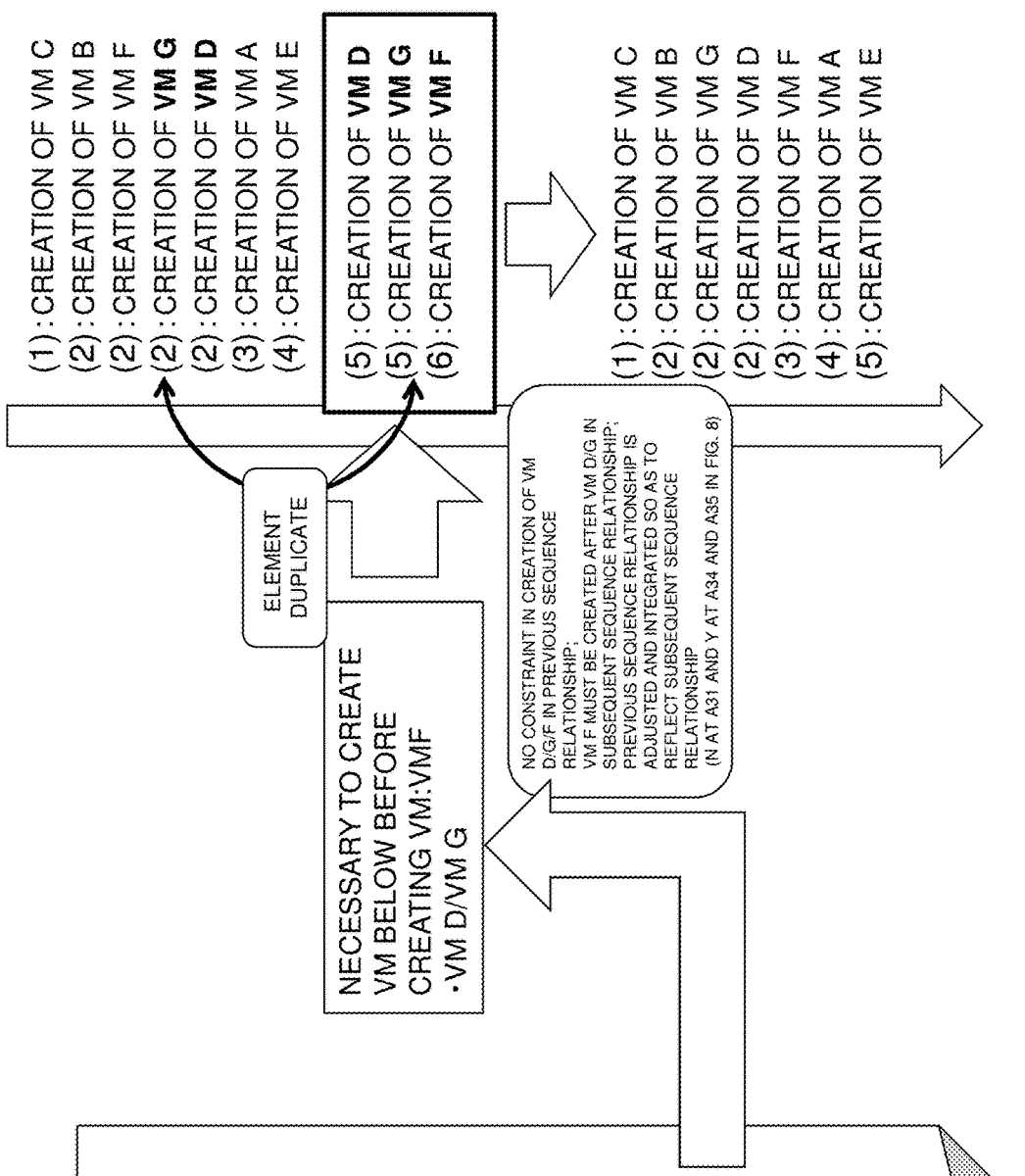
FIG. 19 is a diagram for describing a VNFD confirmation operation by a VNFM in the first exemplary embodiment.

Referring to FIG. 19, a (fifth) dependency of the VNFD has a definition of a dependency of creating VM_D, VM_G before creating VM_F. The VNFM 3 creates the sequence relationship of "(5) VM_D, VM_G, (6) VM_F" in accordance with the relevant dependency. At this time, when a subsequent sequence relationship is integrated with a previous sequence relationship while maintaining the previous sequence relationship, a constraint violation occurs (N in Step A31 of FIG. 8). Therefore, the VNFM 3 adjusts the previous sequence relationship so as to reflect the subsequent sequence relationship, and confirms whether or not the constraint violation can be resolved (Step S34 in FIG. 8). Here, since it is possible to resolve the constraint violation (Y in Step A34 of FIG. 8), the VNFM 3 adjusts the previous sequence relationship so as to reflect the subsequent sequence relationship (Step A35 in FIG. 8). That is, the VNFM 3 has a VM creation sequence of "(1) VM_C, (2) VM_B, VM_G, VM_D, (3) VM_F, (4) VM_A, (5) VM_E".

Figure 20:
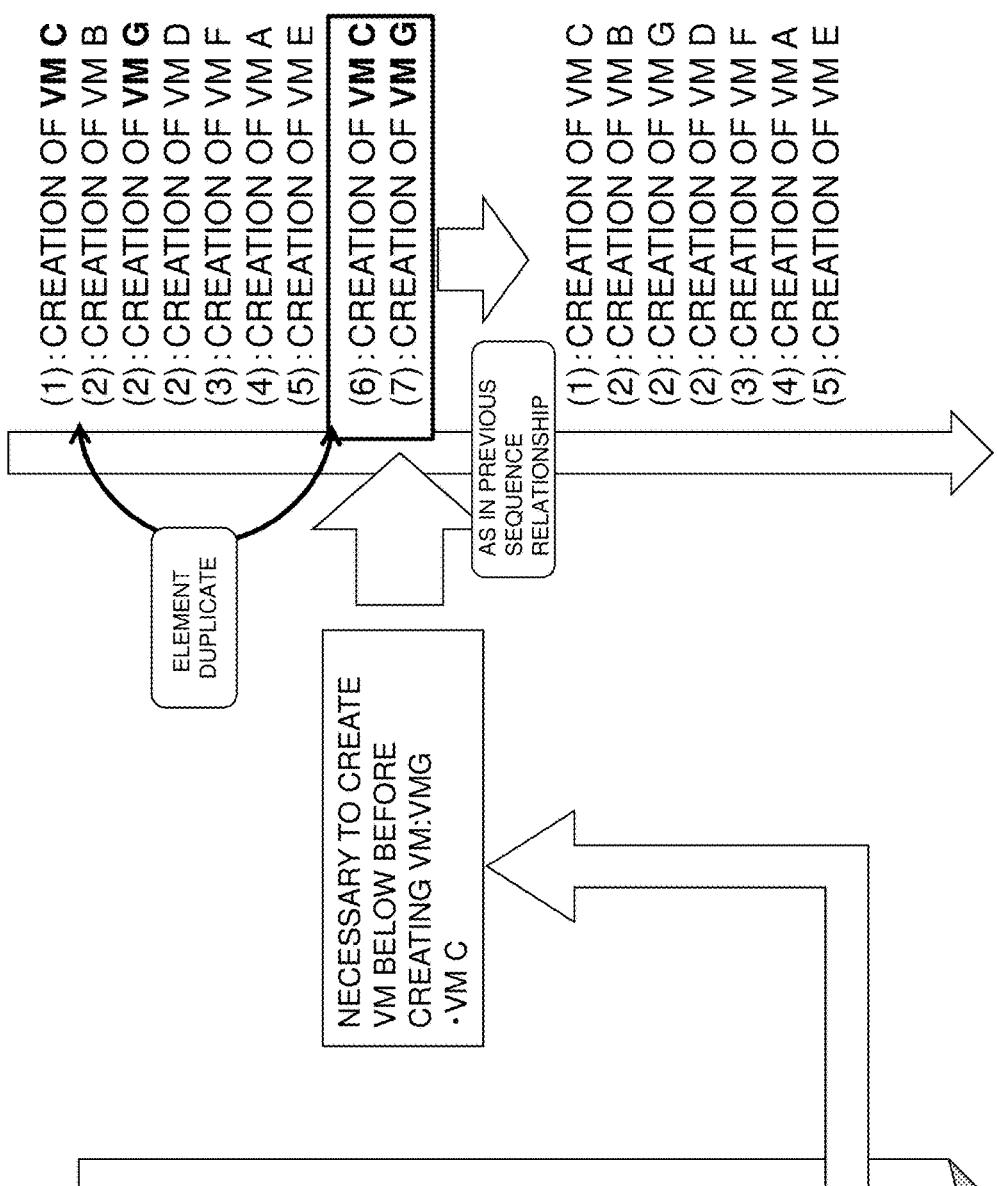
FIG. 20 is a diagram for describing a VNFD confirmation operation by a VNFM in the first exemplary embodiment.

Referring to FIG. 20, a (sixth) dependency of the VNFD has a definition of a dependency of creating VM_C before creating VM_G. The VNFM 3 creates the sequence relationship of "(6) VM_C, (6) VM_G" in accordance with the relevant dependency. At this time, with regard to the previous sequence relationship, the subsequent sequence relationship is already satisfied. At this time, it is possible to maintain the previous sequence relationship as it is (Y in Step S31, Step A32, in FIG. 8). That is, the VNFM 3 has a VM creation sequence of "(1) VM_C, (2) VM_B, VM_G, VM_D, (3) VM_F, (4) VM_A, (5) VM_E".

Figure 21:
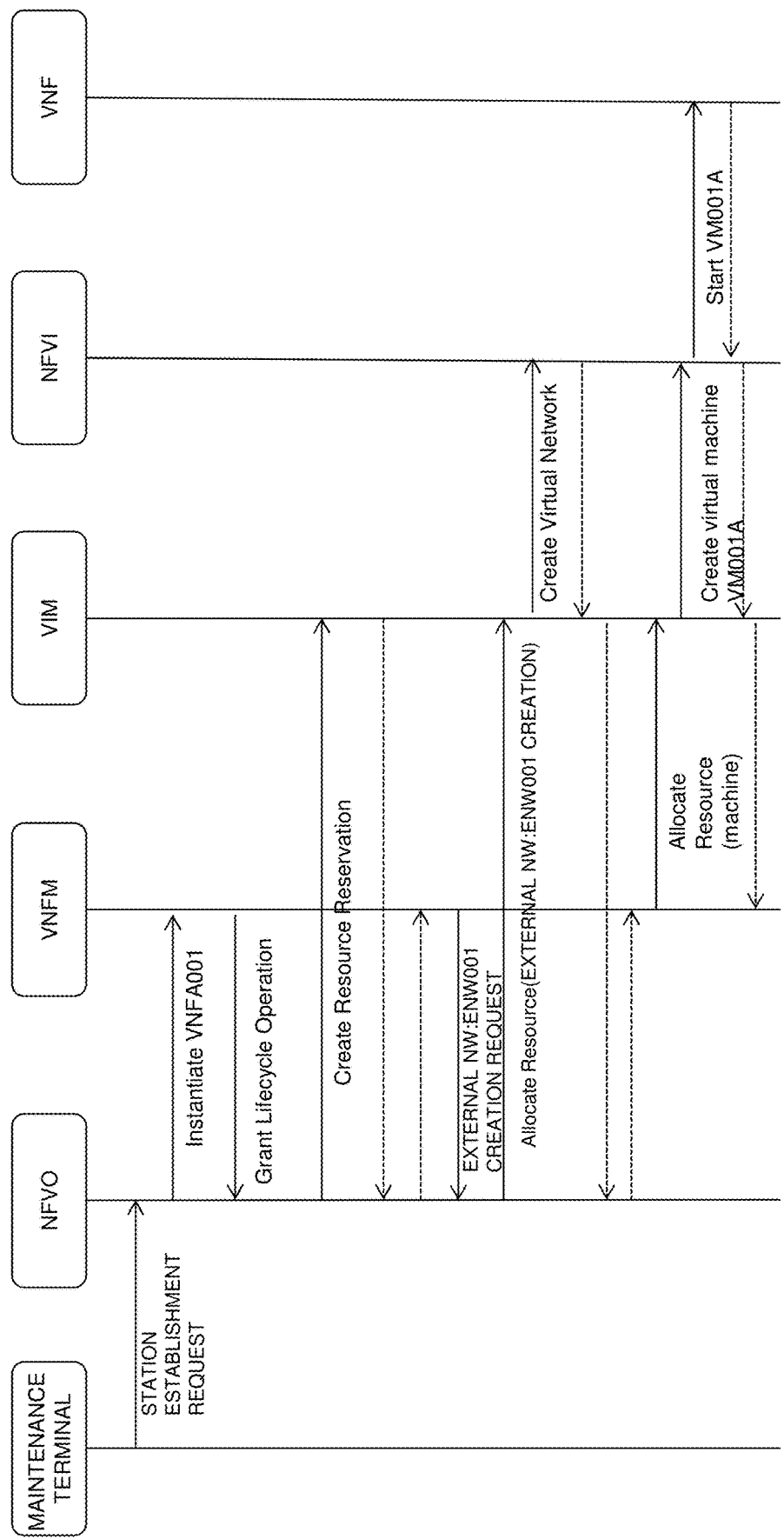
FIG. 21 is a sequence diagram describing an example of operations of the present exemplary embodiment using the NSD and the VNFD shown in FIG. 5.
Figure 22:
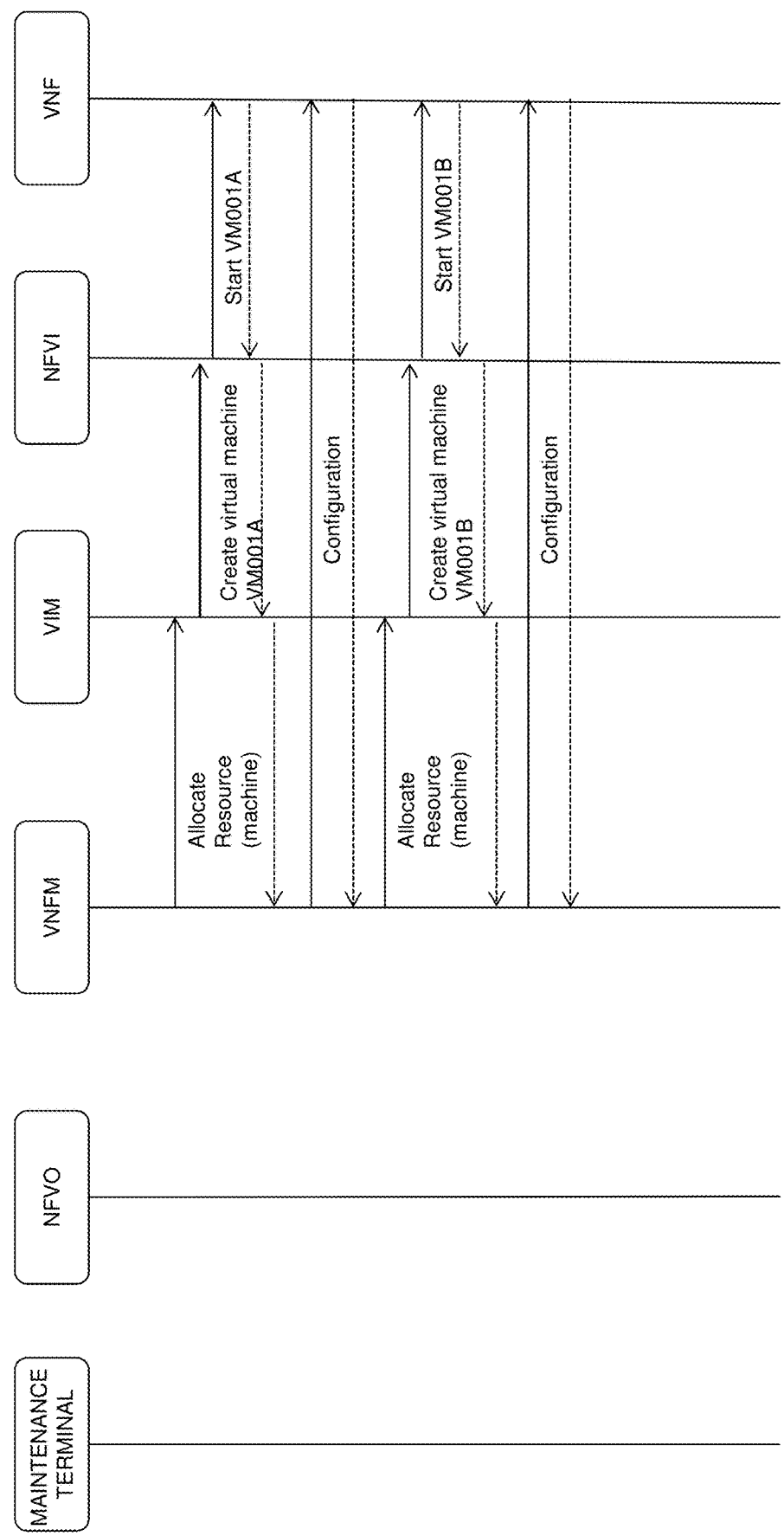
FIG. 22 is a sequence diagram describing an example of operations of the present exemplary embodiment using the NSD and the VNFD shown in FIG. 5.
Figure 23:
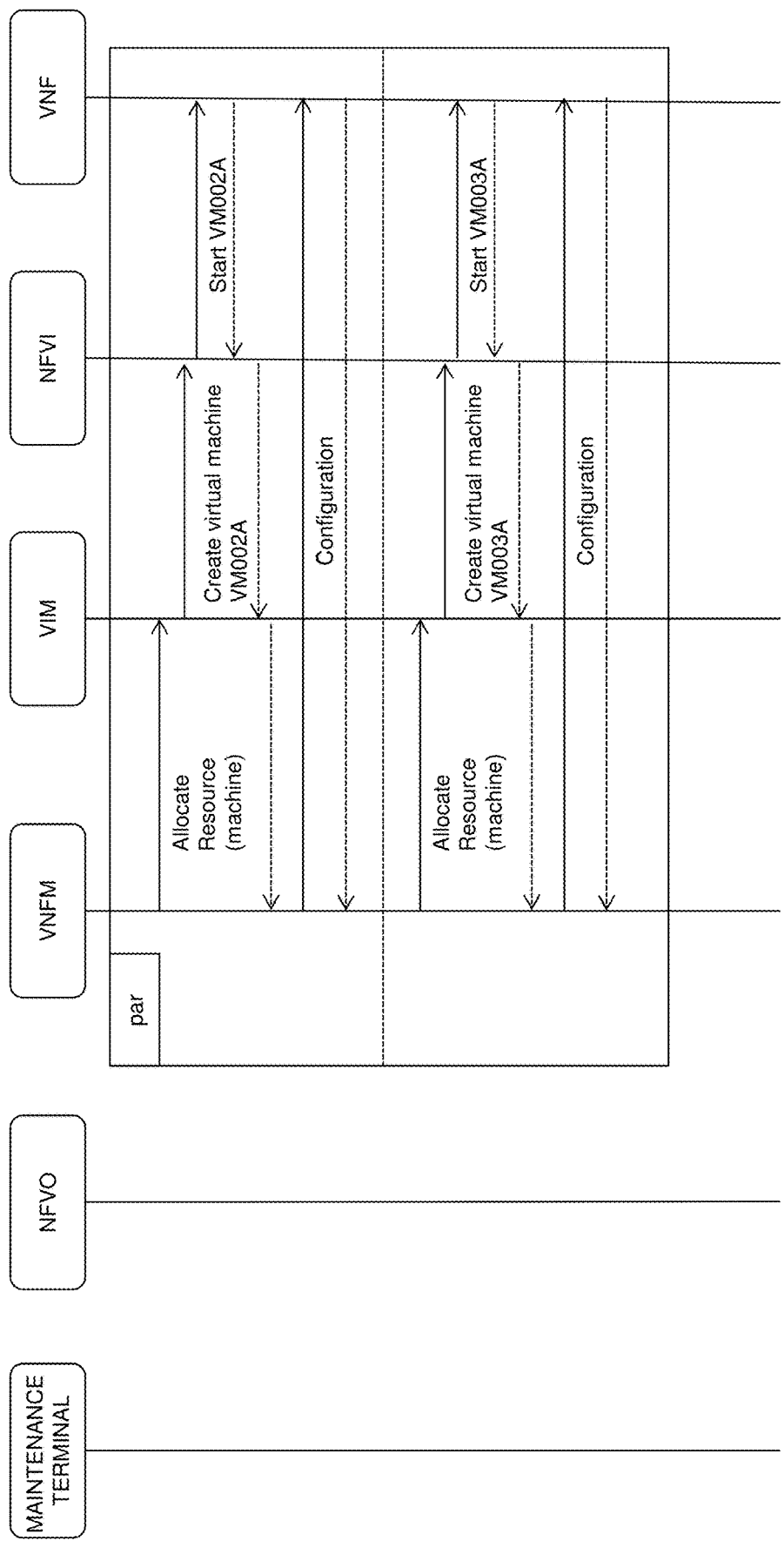
FIG. 23 is a sequence diagram describing an example of operations of the present exemplary embodiment using the NSD and the VNFD shown in FIG. 5.

FIG. 21 to FIG. 23 are sequence diagrams showing operations to deploy VNFs, in accordance with a creation sequence (that is, VNF creation sequence: "(1) VNFA001, (2) VNFB001, VNFC001", VM creation sequence: "(1) ENW001, (2) VM001A, (3) VM001B, (4) VM002A, VM003A") created using the NSD shown in FIG. 12 and the VNFD shown in FIG. 13. In this regard, FIG. 21 to FIG. 23 show sequences up to deploying VNFA001.

Referring to FIG. 21, a maintenance terminal 1 transmits a station establishment request to the NFVO 2.

Next, the NFVO 2 requests the VNFM 3 to create a VNF instance (Instantiate VNF). Thereupon the VNFM 3 permits the NFVO 2 to perform a VNF lifecycle operation (Grant Lifecycle Operation).

Next, the NFVO 2 requests the VIM 4 to reserve a virtual resource (Create Resource Reservation). Thereupon the VNFM 3 requests the NFVO 2 to create ENW001 as an external NW. The NFVO 2 that receives the request requests the VIM 4 to perform allocation (Allocate Resource) of the external NW (ENW001). Thereupon the VIM 4 requests an NFVI 5 to create a virtual network (Create Virtual Network).

Next, the VNFM 3 requests the VIM 4 to perform allocation of a VM corresponding to VM001A (Allocate Resource). Thereupon the VIM 4 requests an NFVI 5 to create VM001A (Create virtual machine). The NFVI 5 that receives the request requests the VNF 6 to start up the VM001A (Start VM001A). Referring to FIG. 22, next the VNFM 3 requests the VNF 6 to perform configuration of the VM001A (Configuration).

Next, the VNFM 3 requests the VIM 4 to perform allocation of a VM corresponding to VM001B (Allocate Resource). Thereupon the VIM 4 requests the NFVI 5 to create VM001B (Create virtual machine). The NFVI 5 that receives the request requests the VNF 6 to start up the VM001B (Start VM001B). Next, the VNFM 3 requests the VNF 6 to perform configuration of the VM001B (Configuration).

Referring to FIG. 23, next the VNFM 3 requests the VIM 4 to perform allocation of a VM corresponding to VM002A (Allocate Resource). Thereupon the VIM 4 requests the NFVI 5 to create VM002A (Create virtual machine). The NFVI 5 that receives the request requests the VNF 6 to start up the VM002A (Start VM002A). Next, the VNFM 3 requests the VNF 6 to perform configuration of the VM002B (Configuration).

Next, the VNFM 3 requests the VIM 4 to perform allocation of a VM corresponding to VM0003A (Allocate Resource). Thereupon the VIM 4 requests the NFVI 5 to create VM003A (Create virtual machine). The NFVI 5 that receives the request requests the VNF 6 to start up the VM003A (Start VM003A). Next, the VNFM 3 requests the VNF 6 to perform configuration of the VM003B (Configuration).

It is to be noted that the operations of creating and configuring VM002A and VM003A, shown in FIG. 23, may be sequentially executed, or may be executed in parallel by using a plurality of function blocks (for example, a plurality of VNFMs, a plurality of VIMs, etc.) By parallel execution, it is possible to deploy the VNFs at high speed.

Specifically, referring to a creation sequence created by the VNFM 3 using the VNFD and dependencies described in the VNFD, in a case where, among dependencies of VMs created next, VMs not being processed are not described, by starting the next creation processing it is possible to implement parallel execution.

In the present exemplary embodiment, the NSD has a newly provided entry that defines dependency between the VNF and a prescribed element. Specifically, as shown in FIG. 5, it is possible to define a VNF and an element (for example, another VNF, an external NW, storage, or the like) having a dependency with the relevant VNF. According to the relevant NSD, it is possible to define another VNF to be created before creation of a certain VNF, an external NW, or storage, and at VNF deployment it is possible to have the VNF and other elements in a desired sequence.

In the present exemplary embodiment, the VNFD has a newly provided entry that defines dependency between the VM and a prescribed element. Specifically, as shown in FIG. 5, it is possible to define a VM and an element (for example, another VM, an external NW, NW among VNFCs, storage, or the like) having a dependency with the relevant VM. According to the relevant VNFD, it is possible to define another VM to be created before creation of a certain VM, an external NW, an NW between VNFCs, storage or the like, and at VNF deployment it is possible to have the VM and other elements in a desired sequence. Therefore, according to the present exemplary embodiment, it is possible to respond to the needs described, for example, with reference to FIG. 9.

The entire disclosed content of the abovementioned Non-Patent Literature is incorporated herein by reference thereto. Modifications and adjustments of exemplary embodiments are possible within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST

1 maintenance terminal
2 NFVO
3, 3-1, 3-2 VNFM
4 VIM
5 NFVI
6, 6-1, 6-2 VNF
7 virtualization management/orchestration apparatus

The invention claimed is:

1. A virtualization management/orchestration apparatus, comprising:
   at least one processor configured to implement:
      a Network Function Virtualization Orchestrator (NFVO) configured to read a Network Service Descriptor (NSD) and confirm whether or not there is a constraint violation among plural dependencies defined in said NSD, wherein said NSD comprises an entry defining dependency related to a Virtualized Network Function (VNF) creation sequence between the Virtualized Network Function (VNF) and a network element; and
      a VNF manager (VNFM) configured to read a Virtualized Network Function Descriptor (VNFD) and confirm whether or not there is a constraint violation among plural dependencies defined in said VNFD, wherein said VNFD comprises an entry defining dependency related to a VM creation sequence between a Virtual Machine (VM) and said network element,
   wherein the at least one processor is further configured to instantiate, by NFVO requests to instantiate, said VNF based on no constraint violation in the VNF creation sequence and the VM creation sequence, according to the VNF creation sequence and the VM creation sequence in a desired sequence according to the VM creation sequence when the VNFM specified the VM creation sequence.

2. The virtualization management/orchestration apparatus according to claim 1, wherein said NSD comprises an entry of an identifier of said VNF, and an identifier of said network element to be created before or created after said VNF.

3. The virtualization management/orchestration apparatus according to claim 1, wherein said VNFD comprises an entry of an identifier of said VM, and an identifier of said network element to be created before or created after said VM.

4. The virtualization management/orchestration apparatus according to claim 1, said VNFD is further configured to create a plurality of creation sequences representing sequences of creating VMs and network elements in accordance with plural dependencies defined in said VNFD, and adjust the sequences in the plurality of creation sequences so that the constraint violation does not occur among said created plurality of creation sequences.

5. A virtualization management/orchestration method, comprising:
- reading, by a Network Function Virtualization Orchestrator (NFVO), a Network Service Descriptor (NSD) and confirming whether or not there is a constraint violation among plural dependencies defined in said NSD, wherein said NSD comprises an entry defining dependency related to a Virtualized Network Function (VNF) creation sequence between the Virtualized Network Function (VNF) and a network element;
- reading, by a VNF manger (VNFM), a Virtualized Network Function Descriptor (VNFD) and confirming whether or not there is a constraint violation among plural dependencies defined in said VNFD, wherein said VNFD comprises an entry defining dependency related to a VM creation sequence between a Virtual Machine (VM) and said network element; and
- instantiating, by NFVO requests to instantiate, said VNF based on no constraint violation in the VNF creation sequence and the VM creation sequence, in accordance with the VNF creation sequence and the VM creation sequence in a desired sequence according to the VM creation sequence when the VNFM specified the VM creation sequence.

6. A non-transitory computer-readable recording medium storing a virtualization management/orchestration program executing on a computer to perform:
- a process of reading, by a Network Function Virtualization Orchestrator (NFVO), a Network Service Descriptor (NSD) and confirming whether or not there is a constraint violation among plural dependencies defined in said NSD, wherein said NSD comprises an entry defining dependency related to a Virtualized Network Function (VNF) creation sequence between the Virtualized Network Function (VNF) and a network element;
- a process of reading, by a VNF manger (VNFM), a Virtualized Network Function Descriptor (VNFD) and confirming whether or not there is a constraint violation among plural dependencies defined in said VNFD, wherein said VNFD comprises an entry defining dependency related to a VM creation sequence between a Virtual Machine (VM) and said network element; and
- instantiating, by NFVO requests to instantiate, said VNF based on no constraint violation in the VNF creation sequence and the VM creation sequence, according to the VNF creation sequence and the VM creation sequence a desired sequence according to the VM creation sequence when the VNFM specified the VM creation sequence.

7. The program according to claim 6, wherein said NSD comprises an entry of an identifier of said VNF, and an identifier of said network element to be created before or created after said VNF.

8. The program according to claim 6, wherein said VNFD comprises an entry of an identifier of said VM, and an identifier of said network element to be created before or created after said VM.

* * * * *